United States Patent [19]

Hafner et al.

[11] Patent Number: 5,753,721
[45] Date of Patent: May 19, 1998

[54] PROCESS FOR THE PHOTO-POLYMERISATION OF CYCLIC OLEFINS USING A THERMOSTABLE MOLYBDENUM OR TUNGSTEN CATALYST

[75] Inventors: Andreas Hafner, Laupen; Paul A. van der Schaaf, Fribourg; Andreas Mühlebach, Belfaux, all of Switzerland

[73] Assignee: Ciba Specialty Chemicals Corporation, Tarrytown, N.Y.

[21] Appl. No.: 646,302

[22] PCT Filed: Nov. 8, 1994

[86] PCT No.: PCT/EP94/03673

§ 371 Date: May 16, 1996

§ 102(e) Date: May 16, 1996

[87] PCT Pub. No.: WO95/14051

PCT Pub. Date: May 26, 1995

[30] Foreign Application Priority Data

Nov. 18, 1993 [CH] Switzerland .................. 03443/93

[51] Int. Cl.$^6$ ............... C08F 2/50; C08F 4/22; C08F 32/04; C08F 34/00
[52] U.S. Cl. ............... 522/53; 522/63; 522/66; 522/168; 522/172; 522/188; 522/186; 522/184; 526/104; 526/281; 526/283
[58] Field of Search ............... 522/29, 66, 53, 522/63, 168, 172, 184, 186, 188; 526/104, 281, 283

[56] References Cited

U.S. PATENT DOCUMENTS 4,060,468  11/1977  Castner ........................ 204/158

OTHER PUBLICATIONS

J. Amer. Chem Soc. vol. 107 pp. 6739–6740 (1985) S. J. Landon et al.

Journal of the Chem Soc. p. 187 (1975) A. Agapiou et al.

Tetrahedron Letters vol. 34 No. 38 pp. 6123–6126 B. Gita et al. (1993).

W. Feast et al. J. Mol. Catal. 65: 63–72 (1991).

J. Feldman et al "Advances in Alkylidenes". Progress in Inorganic Chemistry pp. 1–74 (1991).

F. Huq et al. J. Chem. Soc. Comm. 1079–1080 (1971).

K. Ivin et al. Olefin Metathesis 1–12 Academic Press (1983).

R. Schrock et al. J. Am. Chem. Soc. 112:3875–3886 (1990).

C. Tanielan et al. Tetrahedron Letters 52: 4589–4592 (1977).

H. Thoi et al. J. Mol. Catal. 15:245–270 (1982).

S. Trofimenko. Chem. Rev. 93: 943–980 (1993).

*Primary Examiner*—Susan W. Berman
*Attorney, Agent, or Firm*—Victoria M. Malia

[57] ABSTRACT

A process for photocatalytic polymerisation of a cyclic olefin or of at least two different cyclic olefins in the presence of a metal compound as catalyst, which process comprises carrying out a photochemically induced ring-opening metathesis polymerisation in the presence of a catalytic amount of at least one thermostable molybdenum (VI) or tungsten (VI) compound which contains at least two methyl groups or two monosubstituted methyl groups lacking β-hydrogen atoms in the substituent and which are bonded to the metal atom. The process may be carried out by first irradiating and terminating the polymerisation by heating. The process is suitable for fabricating moulded articles, coatings and relief images.

29 Claims, No Drawings

PROCESS FOR THE PHOTO-POLYMERISATION OF CYCLIC OLEFINS USING A THERMOSTABLE MOLYBDENUM OR TUNGSTEN CATALYST

The present invention relates to a process for the polymerisation of cyclic olefins by photochemical ring-opening metathesis polymerisation using catalytic amounts of a transition metal catalyst, and to compositions comprising said olefins together with a catalytic amount of said catalyst.

Thermally induced ring-opening metathesis polymerisation using catalytic amounts of metal catalysts has been known for some considerable time and is widely described in the literature (q.v. inter alia K. J. Ivin, Olefin Metathesis, Academic Press, London, 1983). Such polymers are prepared industrially and are commercially available. However, photochemically induced ring-opening metathesis polymerisation is only little known and so far commercial utilities have not resulted.

U.S. Pat. No. 4 060 468 discloses an olefin metathesis polymerisation which is carried out by charging a two-component mixture of a metal salt selected from tungsten, molybdenum, rhenium and tantalium salts and a substituted phenol or benzyl alcohol as co-catalysts to a reactor with the olefin monomer, and then irradiating the entire reaction mixture with UV light The only olefins mentioned are cyclic and acylic hydrocarbons without functional groups or substituents. The separate storage of the catalyst components and the process step of mixing the catalyst components directly before the actual reaction make the known process technically complicated and troublesome.

In Tetrahedron Letters No. 52, pp. 4589–4592 (1977), C. Tanielan et al. describe the catalyst system W(CO)$_6$/CCl$_4$, which, after irradiation with UV light, can be used for the metathesis polymerisation of cyclopentene and norbornene. Metal carbonyls are volatile and toxic, so that their use requires elaborate protective measures for physiological reasons. In addition, a free radical addition reaction is observed as competing reaction to form monomeric 1-chloro-2-trichlormethylcycloolefins.

It is known from H. H. Thoi et al., Journal of Molecular Catalysis, 15 (1982), pp. 245–270, that a tungsten pentacarbonylcarbene complex of formula

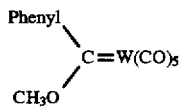

is a thermal catalyst for the ring-opening metathesis polymerisation of dimethyl norbornene and, together with phenyl acetylene as co-catalyst, is also a photocatalyst system for the same polymerisation. This catalyst system has the serious shortcoming that, as ready-for-use formulation, it has only poor storage stability, the carbonyl compound is physiologically unacceptable, and the tolerance to functional groups in cycloolefins is too low.

J. Feldmann et al describe in Progress in Inorganic Chemistry, Vol. 39, pp. 3–73, Edited by Stephen J. Lippard (1991), molybdenum and tungsten alkylidene complexes which, singly, are only poor, but together with Lewis acids, are effective, thermal catalysts for the polymerisation of cycloolefins.

In WO 93/13171 are described one component catalysts on the basis of carbonyl containing Mo- and W-compounds and Ru- or Os-compounds with a polyene ligand for the ring-opening photometathesis of strained cycloolefines. With this catalysts are obtained storage stable compositions under exclusion of light.

N. A. Petasis et al. mention in J. Am. Chem. Soc. 115 (1993), pages 7208–7214 the thermal ring-opening photometathesis of norbornene in using (cyclopentadienyl)$_2$Ti [CH$_2$-Si(CH$_3$)$_3$]$_2$ as thermal catalysts. A photoinitiating activity is not mentioned.

The known catalysts which can be activated photochemically thus mainly require a co-catalyst, for which reason the quality of the resultant polymers can vary greatly owing to the chosen nature and sequence of the reactants.

Polymers obtained from cyclic olefins by photochemical ring-opening metathesis polymerisation can only be prepared by the known processes with a great deal of trouble and in an economically unsatisfactory manner. Particular disadvantages are the poor stability, which only permits the components to be mixed directly before the preparation, the lack of tolerance to functionalised cyclic olefins, and the necessity of using two components as catalyst system. Hence for technical, economic and environmental reasons there is a need to provide an improved and generally useful process for the preparation of polymers from cyclic olefins by photochemical ring-opening metathesis polymerisation.

It has been found that compositions of cycloolefins and a single component catalyst are photochemically polymerisable if the composition contains a molybdenum or tungsten compound in a high state of oxidation, in which at least two alkyl groups lacking β-hydrogen atoms are bonded to the metal atom. Surprisingly, these thermally stable compounds have been found to be effective catalysts for the photochemically induced ring-opening metathesis polymerisation and, despite the photochemical reactivity, the storage stability of mixtures of cycloolefins and the molybdenum or tungsten compounds is retained.

It has also surprisingly been found that the above catalysts act as thermal catalysts even after brief irradiation in the presence of cycloolefins, so that the photochemical and thermal polymerisation can be carried out together.

In one of its aspects, the invention relates to a process for photocatalytic polymerisation of a cyclicolefin, or of at least two different cyclic olefins, in the presence of a metal compound as catalyst, which process comprises carrying out a photochemically induced ring-opening metathesis polymerisation in the presence of a catalytic amount of at least one thermostable molybdenum (VI) or tungsten (VI) compound that contains at least two methyl groups or two monosubstituted methyl groups lacking β-hydrogen atoms in the substituent and which are bonded to the metal atom. Substituent means the substituted methyl group.

The cyclic olefins can be monocyclic or polycyclic fused ring systems, typically containing two to four rings which are unsubstituted or substituted and containing hetero atoms such as O, S, N or Si in one or more than one ring, and/or fused aromatic or heteroaromatic rings such as o-phenylene, o-naphthylene, o-pyridinylene or o-pyrimidinylene. The cyclic rings may contain 3 to 16, preferably 3 to 12 and, most preferably, 3 to 8, ring members. The cyclic olefins may contain further non-aromatic double bonds, preferably 2 to 4 such additional double bonds, depending on the size of the ring. The ring substituents are those that are inert, i.e. that do not impair the chemical stability and the thermostability of the molybdenum or tungsten compounds. Thermostability means within the scope of this invention that the photocatalytically active molybdenum or tungsten compounds, when heated, form no active species for the ring-opening metathesis polymerisation. For example, it has been found that, after heating these catalysts, with exclusion of air, to 110° C. for 24 hours, no such active species are detectable. The catalyst cannot, for example, at room temperature to slightly elevated temperature, e.g. +40° C., initiate any ring-opening metathesis polymerisation over a period of weeks to months, with exclusion of light, and during this time less than 0.2% by weight of monomer is reacted. The thermostabiity can be determined by storing an ethanolic solution containing 20% by weight of monomer and 0.33% by weight of tungsten or molybdenum catalyst at 50° C. for 96 hours in the dark, and any polymer formed (detectable from the turbidity) is not more than 0.2% by weight and preferably not more than 0.1% by weight.

If the cyclic olefins contain more than one double bond, for example 2 to 4 double bonds, crosslinked polymers are formed. This feature is also observed when using (norbornenehydroxymethyl)norbornenecarboxylic acid esters of formula

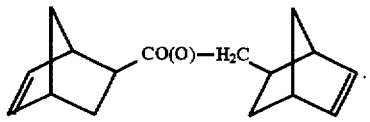

In a preferred embodiment of the novel process, the cycloolefins are of formula I

wherein $Q_1$ is a radical having at least one carbon atom which, together with the —CH=$CQ_2$— group, forms an at least 3-membered alicyclic ring which may contain one or more hetero atoms selected from the group consisting of silicon, phosphorus, oxygen, nitrogen and sulfur; and which radical is unsubstituted or substituted by halogen, =O, —CN, —$NO_2$, $R_1R_2R_3Si$—(O)$_u$—, —COOM, —$SO_3M$, —$PO_3M$, —COO($M_1$)$_{1/2}$, —$SO_3(M_1)_{1/2}$, —$PO_3(M_1)_{1/2}$, $C_1$-$C_{20}$alkyl, $C_1$-$C_{20}$hydroxyalkyl $C_1$-$C_{20}$haloalkyl, $C_1$-$C_6$cyanoalkyl, $C_3$-$C_8$cycloalkyl, $C_6$-$C_{16}$aryl, $C_7$-$C_{16}$aralkyl, $C_3$-$C_6$heterocycloalkyl, $C_3$-$C_6$heteroaryl, $C_4$-$C_{16}$heteroaralkyl or $R_4$—X—; or in which two adjacent C atoms are substituted by —CO—O—CO— or —CO—$NR_5$—CO—; or in which an aromatic or heteroaromatic ring, which is unsubstituted or substituted by halogen, —CN, —$NO_2$, $R_6R_7R_8Si$—(O)$_u$—, —COOM, —$SO_3M$, $PO_3M$, —COO($M_1$)$_{1/2}$, —$SO_3(M_1)_{1/2}$, —$PO_3(M_1)_{1/2}$, $C_1$-$C_{20}$alkyl, $C_1$-$C_{20}$haloalkyl, $C_1$-$C_{20}$hydroxyalkyl, $C_1$-$C_6$cyanoalkyl, $C_3$-$C_8$cycloalkyl, $C_6$-$C_{16}$aryl, $C_7$-$C_{16}$aralkyl, $C_3$-$C_6$heterocycloalkyl, $C_3$-$C_{16}$heteroaryl, $C_4$-$C_{16}$heteroaralkyl or $R_{13}$—$X_1$—, is fused to adjacent carbon atoms of the alicyclic ring;

X and $X_1$ are each independently of the other —O—, —S—, —CO—, —SO—, —$SO_2$—, —O—C(O)—, —C(O)—O—, —C(O)—$NR_5$—, —$NR_{10}$—C(O)—, —$SO_2$—O— or —O—$SO_2$—;

$R_1$, $R_2$ and $R_3$ are each independently of one another $C_1$-$C_{12}$alkyl, $C_1$-$C_{12}$perfluoroalkyl, phenyl or benzyl;

$R_4$ and $R_{13}$ are each independently of the other $C_1$-$C_{20}$alkyl, $C_1$-$C_{20}$haloalkyl, $C_1$-$C_{20}$hydroxyaLkyl, $C_3$-$C_8$cycloalkyl, $C_6$-$C_{16}$aryl or $C_7$-$C_{16}$aralkyl;

$R_5$ and $R_{10}$ are each independently of the other hydrogen, $C_1$-$C_{12}$alkyl, phenyl or benzyl, the alkyl groups in turn being unsubstituted or substituted by $C_1$-$C_{12}$alkoxy or $C_3$-$C_8$cycloalkyl;

$R_6$, $R_7$ and $R_8$ are each independently of one another $C_1$-$C_{12}$alkyl, $C_1$-$C_{12}$perfluoroalkyl, phenyl or benzyl;

M is an alkali metal and $M_1$ is an alkaine earth metal; and u is 0 or 1;

and the alicyclic ring formed with $Q_1$, may contain further non-aromatic double bonds;

$Q_2$ is hydrogen, $C_1$-$C_{20}$alkyl, $C_1$-$C_{20}$haloalkyl, $C_1$-$C_{12}$alkoxy, halogen, —CN or $R_{11}$—$X_2$—;

$R_{11}$ is $C_1$-$C_{20}$alkyl, $C_1$-$C_{20}$haloalkyl, $C_1$-$C_{20}$hydroxyalkyl, $C_3$-$C_8$cycloalkyl, $C_6$-$C_{16}$aryl or $C_7$-$C_{16}$aralkyl;

$X_2$ is —C(O)—O— or —C(O)—$NR_{12}$—;

$R_{12}$ is hydrogen, $C_1$-$C_{12}$alkyl, phenyl or benzyl;

and the above mentioned cycloalkyl, heterocycloalkyl, aryl, heteroaryl, aralkyl and heteroaralkyl groups are unsubstituted or substituted by $C_1$-$C_{12}$alkyl, $C_1$-$C_{12}$alkoxy, —$NO_2$, —CN or halogen, and the hetero atoms of the above mentioned heterocycloalkyl, heteroaryl and heteroaralkyl groups are selected from the group consisting of —O—, —S—, —$NR_9$— and —N=; and $R_9$ is hydrogen, $C_1$-$C_{12}$alkyl, phenyl or benzyl.

Other olefins which are capable of metathesis can be used concurrently in the process of this invention, for example in amounts of up to 40 mol %, preferably 0.01 to 30 mol %, and particularly preferably 0.1 to 20 mol %, based on the total amount of cycloolefins and olefins present.

Olefins which are capable of metathesis, and which the novel polymerisable mixtures of formula I may additionally comprise, can be used for crosslitiing or for regulating the molecular weight. Examples of suitable olefins are cyclooctadiene or cyclooctatriene or compounds having the following structures:

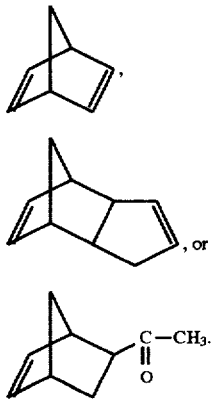

Furthermore, compounds such as 2-butene-1,4-diol, as described in Feast, W. J., Harison, B. J. Mol. Catal. 65, 63 (1991), or 1-hexene (rearrangements) are also suitable.

If the compounds of the formula I contain a centre of asymmetry, then the compounds may be obtained in the form of optical isomers. Some of the compounds of formula I may occur in tautomeric forms (for example keto-enol tautomerism). If an aliphatic C=C double bond is present, geometric isomerism (E-form and Z-form) can also occur. In addition, exo-endo configurations are also possible. Formula I thus embraces all possible stereoisomers which exist in the form of enantiomers, tautomers, diastereomers, E/Z isomers or mixtures thereof.

In the definition of the substituents, the alkyl, alkenyl and alkynyl groups may be straight-chain or branched, as may also the alkyl moiety or each alkyl moiety of alkoxy, alkylthio, alkoxycarbonyl and other alkyl-containing groups. These alkyl groups preferably contain 1 to 12, more particularly 1 to 8, and, most preferably, 1 to 4, carbon atoms. These alkenyl and alkynyl groups preferably contain 2 to 12, more particularly 2 to 8, and, most preferably, 2 to 4, carbon atoms.

Alkyl typically comprises methyl, ethyl, isopropyl, n-propyl, n-butyl, isobutyl, sec-butyl, tert-butyl and the various isomeric pentyl, hexyl, heptyl, octyl, nonyl, decyl, undecyl, dodecyl, tridecyl, tetradecyl, pentadecyl, hexadecyl, heptadecyl, octadecyl, nonadecyl and eicosyl radicals.

Hydroxyalkyl typically comprises hydroxymethyl, hydroxyethyl, 1-hydroxyisopropyl, 1-hydroxy-n-propyl, 2-hydroxy-n-butyl, 1-hydroxy-iso-butyl, 1-hydroxy-sec-butyl, 1hydroxy-tert-butyl and the hydroxy forms of the various isomeric pentyl, hexyl, heptyl, octyl, nonyl, decyl, undecyl, dodecyl, tridecyl, tetradecyl, pentadecyl, hexadecyl, heptadecyl, octadecyl, nonadecyl and eicosyl radicals.

Haloalkyl typically comprises fluoromethyl, difluoromethyl, trifluoromethyl, chloromethyl, dichloromethyl, trichloromethyl, 2,2,2-trifluoroethyl, 2-fluoroethyl, 2-chloroethyl, 2,2,2-trichloroethyl and halogenated, in particular fluorinated or chlorinated, alkanes, for example the isopropyl, n-propyl, n-butyl, isobutyl, sec-butyl, tert-butyl and the various isomeric pentyl, hexyl, heptyl, octyl, nonyl, decyl, undecyl, dodecyl, tridecyl, tetradecyl, pentadecyl, hexadecyl, heptadecyl, octadecyl, nonadecyl and eicosyl radicals.

Alkenyl typically comprises propenyl, isopropenyl, 2-butenyl, 3-butenyl, isobutenyl, n-penta-2,4dienyl, 3-methyl-but-2-enyl, n-oct-2-enyl, n-dodec-2-enyl, isododecenyl, n-octadec-2-enyl and n-octadec-4-enyl.

Cycloalkyl is preferably $C_5$–$C_8$cycloalkyl, most preferably $C_5$– or $C_6$cycloalkyl. Typical examples are cyclopropyl, dimethylcyclopropyl, cyclobutyl, cyclopentyl, methylcyclopentyl, cyclohexyl, cycloheptyl and cyclooctyl.

Cyanoalkyl typically comprises cyanomethyl (methylnitrile), cyanoethyl (ethylnitrile), 1-cyanoisopropyl, 1-cyano-n-propyl, 2-cyano-n-butyl, 1-cyano-iso-butyl, 1-cyano-sec-butyl, 1-cyano-tert-butyl and the different isomeric cyanopentyl and cyanohexyl radicals.

Aralkyl preferably contains 7 to 12 carbon atoms and, most preferably, 7 to 10 C atoms. Aralkyl may typically be benzyl, phenethyl, 3-phenylpropyl, α-methylbenzyl, phenbutyl and α,α-dimethylbenzyl.

Aryl preferably contains 6 to 10 carbon atoms and may typically be phenyl, pentalene, indene, naphthalene, azulene and anthracene.

Heteroaryl preferably contains 4 or 5 carbon atoms and one or two hetero atoms selected from the group consisting of O, S and N. heteroaryl may typically be pyrrole, furan, thiophene, oxazole, thioazole, pyridine, pyrazine, pyrimidine, pyridazine, indole, purine and quinoline.

Heterocycloalkyl preferably contains 4 or 5 carbon atoms and one or two hetero atoms selected from the group consisting of O, S and N. It may typically be oxirane, azirine, 1,2oxathiolane, pyrazoline, pyrrolidine, piperidine, piperazine, morpholine, tetrahydrofuran and tetrahydrothiophene.

Alkoxy is typically methoxy, ethoxy, propoxy, isopropoxy, n-butoxy, isobutoxy, sec-butoxy and tert-butoxy.

Alkali metal in the context of this invention will be understood as meaning lithium, sodium, potassium, rubidium and caesium, preferably lithium, sodium and potassium.

Alkaline earth metal in the context of the present invention will be understood as meaning beryllium, magnesium, calcium, strontium and barium, preferably magnesium and calcium.

In the above definitions, halogen will be understood as meaning fluoro, chloro, bromo and iodo. Fluoro, chloro and bromo are the preferred meanings.

Particularly suitable compounds of the formula I for the process of the invention are those in which $Q_2$ is hydrogen.

Further compounds of formula I which are preferred for the polymerisation are those in which the alicyclc ring that $Q_1$ forms together with the —CH=CQ$_2$— group contains 3 to 16, more particularly 3 to 12 and, most preferably, 3 to 8, ring atoms, which ring system may be monocyclic, bicyclic, tricyclic or tetracyclic.

The inventive process can be carried out with particular advantage with those compounds of the formula I, wherein $Q_1$ is a radical having at least one carbon atom which, together with the —CH=CQ$_2$— group, forms a 3- to 20-membered alicyclic ring which may contain one or more hetero atoms selected from the group consisting of silicon, oxygen, nitrogen and sulfur; which radical is unsubstituted or substituted by halogen, =O, —CN, —NO$_2$, $R_1R_2R_3$Si—(O)$_u$—, —COOM, —SO$_3$M, —PO$_3$M, —COO(M$_1$)$_{1/2}$, —SO$_3$(M$_1$)$_{1/2}$, —PO$_3$(M$_1$)$_{1/2}$, $C_1$-$C_{12}$alkyl, $C_1$-$C_{12}$haloalkyl, $C_1$-$C_{12}$hydroxyalkyl, $C_1$-$C_4$cyanoalkyl, $C_3$-$C_6$cycloalkyl, $C_6$-$C_{12}$aryl, $C_7$-$C_{12}$aralkyl, $C_3$-$C_6$heterocycloalkyl, $C_3$-$C_{12}$heteroaryl, $C_4$-$C_{12}$heteroaralkyl or $R_4$—X—; or two adjacent carbon atoms in said radical $Q_1$ are substituted by —CO—O—CO— or —CO—NR$_5$—CO—; or an aromatic or heteroaromatic ring which is unsubstituted or substituted by halogen, —CN, —NO$_2$, $R_6R_7R_8$Si—, —COOM, —SO$_3$M, —PO$_3$M, —COO(M$_1$)$_{1/2}$, —SO$_3$(M$_1$)$_{1/2}$, —PO$_3$(M$_1$)$_{1/2}$, $C_1$-$C_{12}$alkyl, $C_1$-$C_{12}$haloalkyl, $C_1$-$C_{12}$hydroxyalkyl, $C_1$-$C_4$cyanoalkyl, $C_3$-$C_6$cycloalkyl, $C_6$-$C_{12}$aryl, $C_7$-$C_{12}$aralkyl, $C_3$-$C_6$heterocycloalkyl, $C_3$-$C_{12}$heteroaryl, $C_4$-$C_{12}$hetroaralkyl or $R_{13}$—X$_1$— can be fused to adjacent carbon atoms;

X and X$_1$ are each independently of the other —O—, —S—, —CO—, —SO—, —SO$_2$—, —O—C(O)—, —C(O)—O—, —C(O)—NR$_5$—, —NR$_{10}$—C(O)—, —SO$_2$—O— or —O—SO$_2$—; and R$_1$, R$_2$ and R$_3$ are each independently of one another $C_1$-$C_6$alkyl, $C_1$-$C_6$perfluoroalkyl, phenyl or benzyl;

M is an alkali metal and M$_1$ is an alkaline earth metal;

R$_4$ and R$_{13}$ are each independently of the other $C_1$-$C_{12}$alkyl, $C_1$-$C_{12}$haloalkyl, $C_1$-$C_{12}$hydroxyalkyl, $C_3$-$C_8$cycloalkyl, $C_6$-$C_{12}$aryl or $C_7$-$C_{12}$aralkyl;

R$_5$ and R$_{10}$ are each independently of the other hydrogen, $C_1$-$C_6$alkyl, phenyl or benzyl, the alkyl groups in turn being unsubstituted or substituted by $C_1$-$C_6$alkoxy or $C_3$-$C_6$cycloalkyl;

R$_6$, R$_7$ and R$_8$ are each independently of one another $C_1$-$C_6$alkyl, $C_1$-$C_6$perfluoroalkyl, phenyl or benzyl;

u is 0 or 1;

and the alicyclic ring formed with Q$_1$ may contain further non-aromatic double bonds;

Q$_2$ is hydrogen, $C_1$-$C_{12}$alkyl, $C_1$-$C_{12}$haloalkyl, $C_1$-$C_6$alkoxy, halogen, —CN or R$_{11}$—X$_2$—;

R$_{11}$ is $C_1$-$C_{12}$alkyl, $C_1$-$C_{12}$halogalkyl, $C_1$-$C_{12}$hydroxyalkyl, $C_3$-$C_6$cycloalkyl, $C_6$-$C_{12}$aryl or $C_7$-$C_{12}$aralkyl;

X$_2$ is —C(O)—O— or —C(O)—NR$_{12}$—; and

R$_{12}$ is hydrogen, $C_1$-$C_6$alkyl, phenyl or benzyl;

and the cycloalkyl, heterocycloalkyl, aryl, heteroaryl, aralkyl and heteroaralkyl groups are unsubstituted or substituted by $C_1$-$C_6$alkyl, $C_1$-$C_6$alkoxy, —NO$_2$, —CN or halogen, and the hetero atoms of the heterocycloalkyl, heteroaryl and heteroaralkyl groups are selected from the group consisting of —O—, —S—, —NR$_9$— and —N=; and $R_9$ is hydrogen, $C_1$–$C_6$alkyl, phenyl or benzyl.

Among this group, those compounds of formula I are preferred wherein $Q_1$ is a radical having at least one carbon atom which, together with the —CH=CQ$_2$—group, forms a 3- to 10-membered alicyclic ring which may contain a hetero atom selected from the group consisting of silicon, oxygen, nitrogen and sulfur, and which radical is unsubstituted or substituted by halogen, —CN, —NO$_2$, $R_1R_2R_3Si$—, —COOM, —SO$_3$M, —PO$_3$M, —COO(M$_1$)$_{1/2}$, —SO$_3$(M$_1$)$_{1/2}$, —PO$_3$(M$_1$)$_{1/2}$, $C_1$–$C_6$alkyl, $C_1$–$C_6$haloalkyl, $C_1$–$C_6$hydroxyallyl, $C_1$–$C_4$cyanoalkyl, $C_3$–$C_6$cycloalkyl, phenyl, benzyl or $R_4$—X—; or an aromatic or heteroaromatic ring which is unsubstituted or substituted by halogen, —CN, —NO$_2$, $R_6R_7R_8Si$—, —COOM, —SO$_3$M, —PO$_3$M, —COO(M$_1$)$_{1/2}$, —SO$_3$(M$_1$)$_{1/2}$, —PO3(M$_1$)$_{1/2}$, $C_1$–$C_6$alkyl, $C_1$–$C_6$haloalkyl, $C_1$–$C_6$hydroxyalkyl, $C_1$–$C_4$cyanoalkyl, $C_3$–$C_6$cycloalkyl, phenyl, benzyl or $R_{13}$—X$_1$— can be fused to adjacent carbon atoms;

$R_1$, $R_2$ and $R_3$ are each independently of one another $C_1$–$C_4$alkyl, $C_1$–$C_4$perfluoroalkyl, phenyl or benzyl;

M is an alkali metal and M$_1$ is an alkaline earth metal;

$R_4$ and $R_{13}$ are each independently of the other $C_1$–$C_6$alkyl, $C_1$–$C_6$haloalkyl, $C_1$–$C_6$hydroxyalkyl or $C_3$–$C_6$cycloalkyl; —O—, —S—, —CO—, —SO—or —SO2—;

X and X$_1$ are each independently of the other —O—, —S—, —CO—, —SO— or —SO$_2$—; $R_6$, $R_7$ and $R_8$ are each independently of one another $C_1$–$C_4$alkyl, $C_1$–$C_4$perfluoroalkyl, phenyl or benzyl; and $Q_2$ is hydrogen.

The process of this invention is particularly suitable for the polymerisation of norbornenes and norbornene derivatives. Among these norbornene derivatives, those compounds are especially preferred which conform to formula II

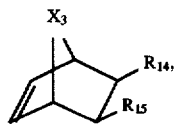
(II)

wherein $X_3$ is —CHR$_{16}$—, oxygen or sulfur, $R_{14}$ and $R_{15}$ are each independently of the other hydrogen, —CN, trifluoromethyl, (CH$_3$)$_3$Si—O—, (CH$_3$)$_3$Si— or —COOR$_{17}$; and $R_{16}$ and $R_{17}$ are each independently of the other hydrogen, $C_1$–$C_{12}$alkyl, phenyl or benzyl; or to formula III

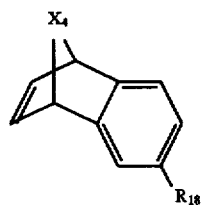
(III)

wherein $X_4$ is —CHR$_{19}$—, oxygen or suilir;

$R_{19}$ is hydrogen, $C_1$–$C_{12}$alkyl, phenyl or benzyl; and $R_{18}$ is hydrogen, $C_1$–$C_6$alkyl or halogen; or to formula IV

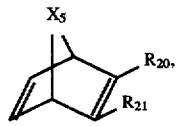
(IV)

wherein $X_5$ is —CHR$_{22}$—, oxygen or sulfur;

$R_{22}$ is hydrogen, $C_1$–$C_{12}$alkyl, phenyl or benzyl;

$R_{20}$ and $R_{21}$ are each independently of the other hydrogen, CN, trifluoromethyl, (CH$_3$)$_3$Si—O—, (CH$_3$)$_3$Si— or —COOR$_{23}$; and $R_{23}$ is hydrogen, $C_1$–$C_{12}$alkyl, phenyl or benzyl;

or to formula V

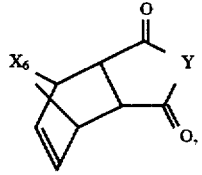
(V)

wherein $X_6$ is —CHR$_{24}$—, oxygen or sulfur;

$R_{24}$ is hydrogen, $C_1$–$C_{12}$alkyl, phenyl or benzyl;

Y is oxygen or

and $R_{25}$ is hydrogen, methyl, ethyl or phenyl.

The following compounds of formula I are particularly suitable for the polymerisation process of this invention:

(1)

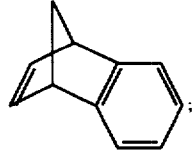
(2)

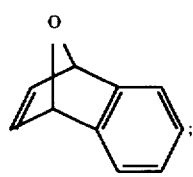
(3)

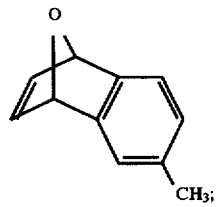
(4)

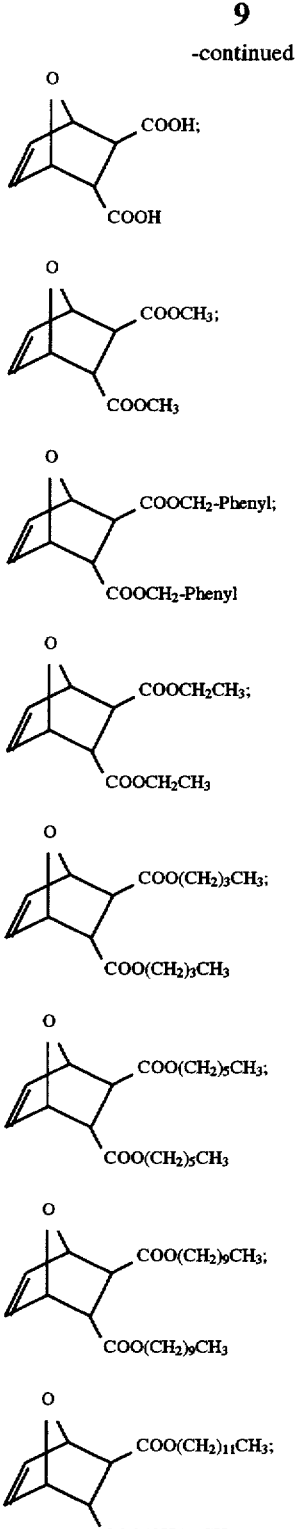
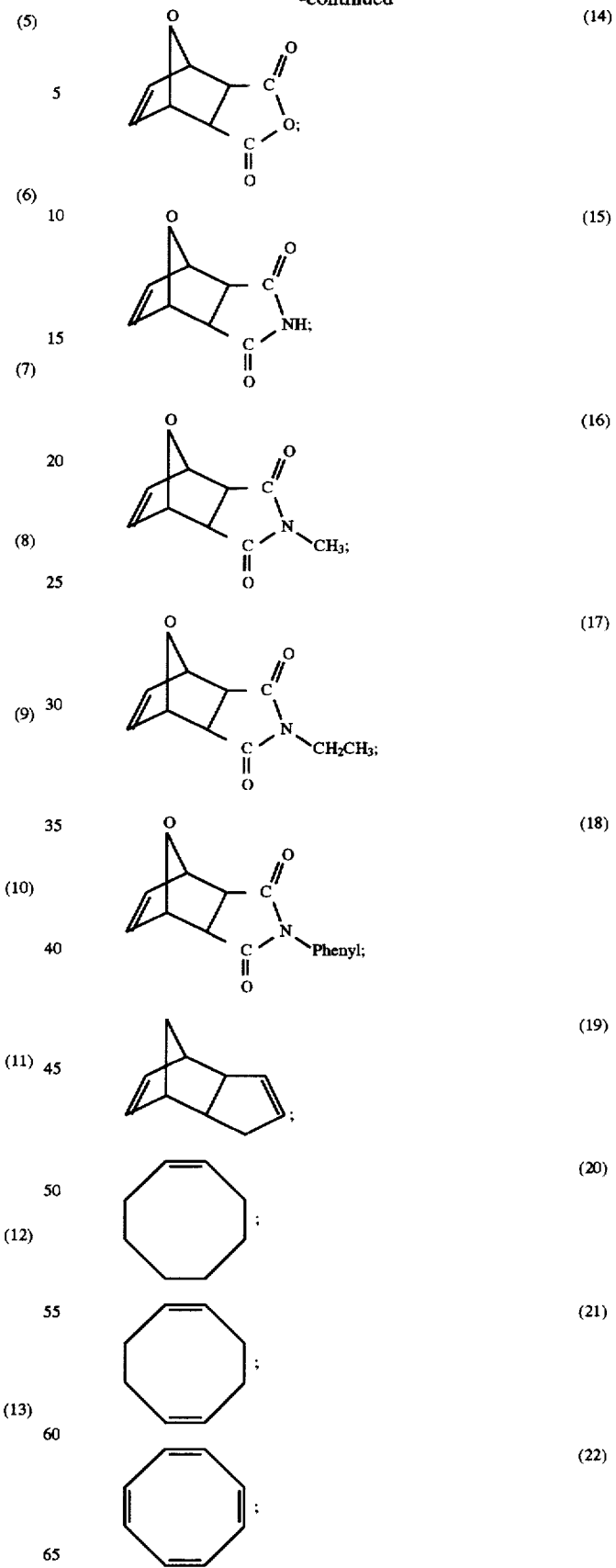

-continued

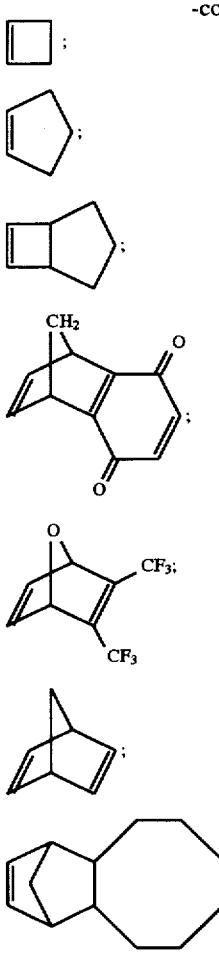

(23)

(24)

(25)

(26)

(27)

(28)

(29)

The molybdenum and tungsten compounds to be used in the practice of this invention may be those which contain one metal atom or two metal atoms linked through a single, double or triple bond. The compounds contain at least two, more particularly two to six and, most preferably, two to four methyl groups or monosubstituted methyl groups lacking β-hydrogen atoms as metal-ligand bonds. The other valencies of molybdenum and tungsten are preferably saturated with thermostable neutral ligands (the definition of thermostability has been stated at the outset). This ligand without β-hydrogen atoms preferably has the formula VII

—CH$_2$—R    (VII), wherein R is H, —CF$_3$, —CR$_{26}$R$_{27}$R$_{28}$, —SiR$_{29}$R$_{30}$R$_{31}$, unsubstituted or C$_1$–C$_6$alkyl- or C$_1$–C$_6$alkoxy-substituted C$_6$–C$_{16}$aryl or C$_4$–C$_{15}$heteroaryl containing 1 to 3 hetero atoms selected from the group consisting of O, S and N; and R$_{26}$, R$_{27}$ and R$_{28}$ are each independently of one another C$_1$–C$_{10}$alkyl which is unsubstituted or substituted by C$_1$–C$_{10}$alkoxy, or R$_{26}$ and R$_{27}$ have this meaning and R$_{28}$ is C$_6$–C$_{10}$aryl or C$_4$–C$_9$heteroaryl which is unsubstituted or substituted by C$_1$–C$_6$alkyl or C$_1$–C$_6$alkoxy; and R$_{29}$, R$_{30}$ and R$_{31}$ are each independently of one another C$_1$–C$_6$alkyl, C$_5$- or C$_6$cycloalkyl, or unsubstituted phenyl or benzyl or phenyl or benzyl each substituted by C$_1$–C$_6$alkyl or C$_1$–C$_6$alkoxy.

R$_{26}$ to R$_{31}$ in the significance of alkyl may be linear or branched and contain preferably 1 to 8 and, most preferably, 1 to 4, carbon atoms. R$_{28}$ to R$_{31}$ defined as aryl are preferably phenyl or naphthyl.

R in defined in formula VII as aryl is preferably phenyl or naphthyl. R defined in formula VII as heteroaryl is preferably pyridinyl, furanyl, thiophenyl or pyrrolyl.

Preferred substituents for R$_{26}$ to R$_{31}$ within the scope of the definitions are methyl, ethyl, methoxy and ethoxy. Exemplary substituents R$_{26}$ to R$_{31}$ have been cited previously in connection with the compounds formula I.

In a preferred embodiment of the invention, the group R in formula VII is H, —C(CH$_3$)$_3$, —C(CH$_3$)$_2$C$_6$H$_5$, unsubstituted phenyl or phenyl which is substituted by methyl, ethyl, methoxy or ethoxy, —CF$_3$, or —Si(CH$_3$)$_3$.

The other 1 to 4 valencies of the Mo(VI) and W(VI) atoms can be saturated with identical or different ligands selected from the group consisting of =O, =N—R$_{33}$, secondary amines containing 2 to 18 carbon atoms, R$_{32}$O— or R$_{32}$S—, halogen, cyclopentadienyl or bridged biscylopentadienyl, tridentate monoanionic ligands, or neutral ligands such as arenes, olefins, ethers, nitriles, CO and tertiary phosphines and amines, wherein the R$_{32}$ substituents independently of each other are unsubstituted or C$_1$–C$_6$alkoxy- or halogen-substituted linear or branched C$_1$–C$_{18}$alkyl, C$_5$— or C$_6$cycloalkyl which is unsubstituted or substituted by C$_1$–C$_6$alkyl, C$_1$–C$_6$alkoxy or halogen, or phenyl which is unsubstituted or substituted by C$_1$–C$_6$alkyl, C$_1$–C$_6$alkoxy, C$_1$–C$_6$alkoxymethyl, C$_1$–C$_6$alkoxyethyl or halogen, or benzyl which is unsubstituted or substituted by C$_1$–C$_6$alkyl, C$_1$–C$_6$alkoxy, C$_1$–C$_6$alkoxymethyl, C$_1$–C$_6$alkoxyethyl or halogen, or phenylethyl; and R$_{33}$ is unsubstituted or C$_1$–C$_6$alkoxy-substituted linear or branched C$_1$–C$_{18}$alkyl, C$_5$- or C$_6$cycloalkyl which is unsubstituted or substituted by C$_1$–C$_6$alkyl, C$_1$–C$_6$alkoxy or halogen, phenyl which is unsubstituted or substituted by C$_1$–C$_6$alkyl, C$_1$–C$_6$alkoxy, C$_1$–C$_6$alkoxymethyl, C$_1$–C$_6$alkoxyethyl, di(C$_1$–C$_6$-alkyl) amino, di(C$_1$–C$_6$alkyl)amino-C$_1$–C$_3$alkyl or halogen, or benzyl which is unsubstituted or substituted by C$_1$–C$_6$alkyl, C$_1$–C$_6$alkoxy, C$_1$–C$_6$alkoxymethyl, C$_1$–C$_6$alkoxyethyl or halogen, or phenylethyl.

Secondary amines are preferably those of formula R$_{34}$R$_{35}$N—, wherein R34 and R$_{35}$ are each independently of the other linear or branched C$_1$–C$_{18}$alkyl, C$_5$- or C$_6$cycloalkyl, unsubstituted or C$_1$–C$_6$alkoxy- or halogen-substituted benzyl or phenylethyl, (C$_1$–C$_6$alkyl)$_3$Si or, taken together, are tetramethylene, pentamethylene or 3-oxapentan-1,5-diyl. Alkyl preferably contains 1 to 12 and, most preferably, 1 to 6, carbon atoms. Typical examples are dimethylamino, diethylamino, di-n-propylamino, diisopropylamino, di-n-butylamino, methylethylamino, dibenzylamino, benzylmethyereino, diphenylamino, phenylmethylamino and di(tdriethylsilyl)amino.

Halogen as ligand or substituent is preferably F and, most preferably, Cl.

Cyclopentadienyl may be unsubstituted or substituted by one to five C$_1$–C$_4$alkyl groups, preferably methyl, or —Si (C$_1$–C$_4$alkyl), preferably —Si(CH$_3$)3. Bridged cyclopentadienyls are preferably those of formula R$_{36}$—A—R$_{36}$, wherein R$_{36}$ is cyclopentadienyl which is unsubstituted or substituted by one to five C$_1$–C$_4$alkyl groups, preferably methyl, or —Si(C$_1$–C$_4$alkyl), preferably —Si(CH$_3$)$_3$, and A is —CH$_2$—, —CH$_2$—CH$_2$—, —Si(CH$_3$)$_2$—, —Si(CH$_3$)$_2$—Si(CH$_3$)$_2$— or —Si(CH$_3$)$_2$—O—Si(CH$_3$)$_2$—.

Suitable arenes are typically aromatic hydrocarbons or fused hydrocarbons containing 6 to 18 carbon atoms, or 5- or 6membered heterocycles or fused heterocycles containing one hetero atom selected from the group consisting of O, S and N and containing 4 to 17 carbon atoms. Typical examples are benzene, naphthalene, naphthacene, pyrene, pyridine, quinoline and thiophene.

Olefins as neutral ligands may typically be open-chain or cyclic mono- or diolefins containing 2 to 8 carbon atoms.

Typical examples are ethene, propene, butene butadiene, hexene, hexadiene, cyclohexadiene and cyclooctadiene.

Ethers suitable as neutral ligands may be dialkyl ethers containing 2 to 8 carbon atoms or cyclic ethers containing 5 or 6 ring members. Typical examples are diethyl ether, methyl ethyl ether, diethyl ether, di-n-propyl ether, diisopropyl ether, di-n-butyl ether, ethylene glycol dimethyl ether, tetrahydrofuran and dioxane.

Nitriles suitable as neutral ligands may be aliphatic or aromatic nitriles containing 1 to 12, preferably 1 to 8, carbon atoms. Typical examples are acetonitrile, propionitrile, butyl nitrile, benzonitrile and benzyl nitrile.

Tertiary amines and phosphines suitable as neutral ligands may be those containing 3 to 24, preferably 3 to 18, carbon atoms. Typical examples are trimethylamine and trimethylphosphine, triethylamine and triethylphosphine, tri-n-propylamine and tri-n-propylphosphine, tri-n-butylamine and tri-n-butylphosphine, triphenylamine and tri-phenylphosphine, tricyclohexylamine and tricyclohexylphosphine, phenyldimethylamine and phenyldimethylphosphine, benzyldimethylamine and benzyldimethylphosphine, 3,5-dimethylphenyldimethylamine and 3,5-dimethylphenyldimethylphosphine.

The tridentate monoanionic ligands may typically be hydro(trispyrazol-1-yl)borates or alkyl(trispyrazol-1-yl) borates, which are unsubstituted or substituted by 1 to 3 $C_1$–$C_4$alkyl groups [q.v. S. Trofimenko, Chem. Rev., 93, pp. 943–980 (1993)], or $[C_5(R'_5)Co(R_{37}R_{38}P=O]^\ominus$, wherein R' is H or methyl and $R_{37}$ and $R_{38}$ are each independently of the other $C_1$–$C_4$alkyl, $C_1$–$C_4$alkoxy or phenyl [q.v. W. Klaui, Angew. Chem. 102, pp. 661–670 (1990)].

Halogen as substituent of $R_{32}$ and $R_{33}$ is preferably fluoro and, most preferably, chloro. The substituents alkyl, alkoxy or alkoxy in alkoxymethyl or alkoxyethyl preferably contain 1 to 4 and, most preferably, 1 or 2 carbon atoms. Typical examples are methyl, ethyl, n- and isopropyl, n-, iso- and tert-butyl, methoxy, ethoxy, n- and isopropoxy and n-, iso- and tert-butoxy.

$R_{32}$ and $R_{33}$ contain as alkyl preferably 1 to 12, more particularly 1 to 8 and, most preferably, 1 to 4, carbon atoms. Branched alkyl is preferred. Typical examples of of $R_{32}$ are methoxy, ethoxy, n- and isopropoxy, n-, iso- and tert-butoxy, hexafluoroisopropoxy and hexa- and perfluorobutoxy.

Typical examples of substituted phenyl and benzyl for $R_{32}$ and $R_{33}$ are p-methylphenyl or benzyl p-fluorophenyl or p-chlorophenyl or p-chlorobenzyl, p-ethylphenyl or ethylbenzyl, p-n- or isopropylphenyl or p-n- or isopropylbenzyl, p-isobutylphenyl or p-isobutylbenzyl, 3-methylphenyl or 3-methylbenzyl, 3-isopropylphenyl or 3-isopropylbenzyl 3,5-dimethylphenyl or 3,5-dimethylbenzyl, 3,5-isopropylphenyl or 3,5-isopropylbenzyl, 3,5-n- or -tert-butylphenyl and 3,5-n- or -tert-butylbenzyl. $R_{33}$ is most preferably unsubstituted or $C_1$–$C_4$alkyl- or $C_1$–$C_4$alkoxy-substituted phenyl.

In a preferred embodiment of the invention, the molybdenum and tungsten compounds are in particular compounds of formula VIII and also of formulae VIIIa, VIIIb and VIIIc,

(VIII)

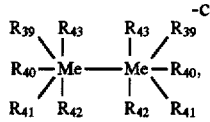

(VIIIa)

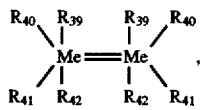

(VIIIb)

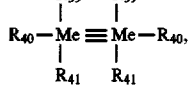

(VIIIc)

wherein
Me is Mo(VI) or W(VI),
at least two, preferably 2 to 4, of the substituents $R_{39}$ to $R_{44}$ are a radical —$CH_2$—R of formula VII, R is H, —$CF_3$, —$CR_{26}R_{27}R_{28}$, —$SiR_{29}R_{30}R_{31}$, unsubstituted or $C_1$–$C_6$alkyl- or $C_1$–$C_6$alkoxy-substituted $C_6$–$C_6$aryl or $C_4$–$C_{15}$heteroaryl containing 1 to 3 hetero atoms selected from the group consisting of O, S and N;

$R_{26}$, $R_{27}$ and $R_{28}$ are each independently of the other $C_1$–$C_{10}$alkyl which is unsubstituted or substituted by $C_1$–$C_{10}$alkoxy, or $R_{26}$ and $R_{27}$ have this meaning and $R_{28}$ is $C_6$–$C_{10}$aryl or $C_4$–$C_9$heteroaryl which is unsubstituted or substituted by $C_1$–$C_6$alkyl or $C_1$–$C_6$alkoxy; and $R_{29}$, $R_{30}$ and $R_{31}$ are each independently of one another $C_1$–$C_6$alkyl, $C_5$- or $C_6$cycloalkyl, or unsubstituted or $C_1$–$C_6$alkyl- or $C_1$–$C_6$alkoxy-substituted phenyl or benzyl;

two each of the remaining substituents $R_{39}$ to $R_{44}$ are =O or =N—$R_{33}$, and $R_{33}$ is unsubstituted or $C_1$–$C_6$alkoxy-substituted linear or branched $C_1$–$C_{18}$alkyl, unsubstituted or $C_1$–$C_6$aLkyl-, $C_1$–$C_6$alkoxy- or halogen-substituted $C_5$- or $C_6$cycloalkyl, unsubstituted phenyl or phenyl which is substituted by $C_1$–$C_6$alkyl, $C_1$–$C_6$alkoxy, $C_1$–$C_6$alkoxymethyl, $C_1$–$C_6$alkoxyethyl or halogen, or benzyl or phenylethyl each of which is unsubstituted or substituted by $C_1$–$C_6$alkyl, $C_1$–$C_6$alkoxy, $C_1$–$C_6$alkoxymethyl, $C_1$–$C_6$alkoxyethyl or halogen; and/ or the remaining substituents $R_{39}$ to $R_{44}$ are secondary amino containing 2 to 18 carbon atoms, $R_{32}$O— or $R_{32}$S—, halogen, cyclopentadienyl or bridged biscylopentadienyl or a neutral ligand, wherein the $R_{32}$ substituents are each independently of the other unsubstituted or $C_1$–$C_6$alkoxy- or halogen-substituted linear or branched $C_1$–$C_{18}$alkyl, unsubstituted or $C_1$–$C_6$alkyl-, $C_1$_$C_6$alkoxy or halogen-substituted $C_5$- or $C_6$cycloalkyl, unsubstituted phenyl or phenyl which is substituted by $C_1$–$C_6$alkyl, $C_1$–$C_6$alkoxy, $C_1$–$C_6$alkoxymethyl, $C_1$–$C_6$alkoxyethyl, di($C_1$–$C_6$-alkyl) amino, di($C_1$–$C_6$-alkyl)amino-$C_1$–$C_3$alkyl or halogen, or benzyl or phenylethyl each of which is substituted by $C_1$–$C_6$alkyl, $C_1$–$C_6$alkoxy, $C_1$–$C_6$alkoxymethyl, $C_1$–$C_6$alkoxyethyl or halogen With respect to R and $R_{26}$ to $R_{33}$, the preferred meanings previously given apply.

In a particularly preferred embodiment of the process of this invention, molybdenum and tungsten compounds of formula VIII are used, wherein
a) $R_{39}$ to $R_{44}$ are a radical of formula VII —$CH_2$—R, or
b) $R_{39}$ and $R_{40}$ are a radical of formula VII —$CH_2$—R, $R_{41}$ and $R_{42}$ together are a radical =N—$R_{33}$, and $R_{43}$ and $R_{44}$ together are $R_{32}$—O— or halogen, or
c) $R_{43}$ and $R_{44}$ together and $R_{41}$ and $R_{42}$ together are the radical =N—$R_{33}$, and $R_{39}$ and $R_{40}$ are a radical of formula VII —$CH_2$—R, and R, R$_{32}$ and R$_{33}$ have the meanings given above. With respect to R, R$_{32}$ and R$_{33}$, the preferred meanings given above apply.

Among the compounds of formula VIIIc, those compounds are especially preferred in which R$_{39}$, R$_{40}$ and R$_4$, are a radical of formula VII, which radical is most preferably —CH$_2$—Si(C$_1$-C$_4$akyl)$_3$.

In the process of this invention it is most especially preferred to use molybdenum and tungsten compounds of formulae IX, IXa or Ixb,

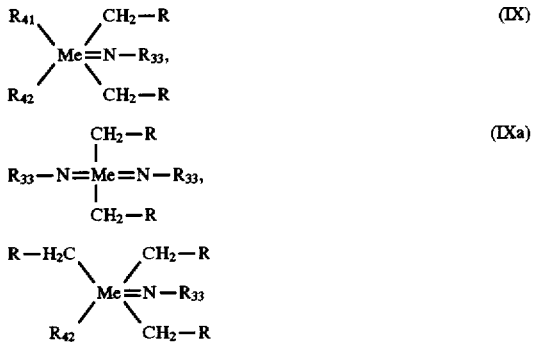

wherein
Me is Mo(VI) or W(VI),
R is H, —C(CH$_3$)$_3$, —C(CH$_3$)$_2$—C$_6$H$_5$, —C$_6$H$_5$ or —Si(C$_1$-C$_4$alkyl)$_3$,
R$_{33}$ is phenyl or phenyl which is substituted by 1 to 3 C$_1$-C$_4$alkyl or C$_1$-C$_4$alkoxy groups,
R$_{41}$ is unsubstituted or fluoro-substituted linear or, preferably, branched C$_1$-C$_4$alkoxy, and
R$_{42}$ has the same meaning as R$_{41}$ or is F, Cl or Br. R$_{41}$ is most preferably branched alkoxy or branched alkoxy which may be partially or completely fluorinated, typically isopropoxy, iso- and tert-butoxy, hexafluoropropoxy and nonafluoropropoxy. R$_{42}$ is preferably Cl.

Typical examples of molybdenum and tungsten compounds are:
Mo$_2$[CH$_2$Si(CH$_3$)$_3$]$_6$, W(=N—C$_6$H$_5$)(OCH(CH$_3$) 2)(Cl)[(CH$_2$Si(CH$_3$)3)]$_2$,
W(=N—C$_6$H$_5$)(OCH(CF$_3$)2)[(CH$_2$Si(CH$_3$)$_3$)]$_2$,
Mo(=N—3,5-diisopropylC$_6$H$_5$)$_2$[(CH$_2$C(CH$_3$)$_2$—C6H$_5$)]$_2$,
Mo(=N—3,5-diisopropylC$_6$H$_5$)$_2$[(CH$_2$—C$_6$H$_5$)]$_2$,
Mo(=N—3,5-dimethylC$_6$H$_5$)$_2$[(CH$_2$—C$_6$H$_5$)]$_2$,
Mo(=N—3,5-dimethylC$_6$H$_5$)$_2$(CH$_3$)$_2$(tetrahydrofuran),
[(CH$_3$)$_3$SiCH$_2$]$_3$Mo≡Mo[CH$_2$Si(CH$_3$)$_3$]$_3$, W(=NC$_6$H$_5$)[CH$_2$Si(CH$_3$)$_3$]Cl.

The molybdenum and tungsten compounds used in the process of this invention are known or can be prepared by known and analogous methods starting from metal halides and Grignard reactions [q.v. inter alia F. Hug et al. J. Chem. Soc., Chem. Commun., page 1079 (1971) or R. R. Schrock et al., J. Am. Chem. Soc., Vol. 112, page 3875 (1990)].

The inventive process can be carried out in the presence of an inert solvent. A particular advantage of the inventive process is that, if liquid monomers are used, the process can be carried out without a solvent. Inert means that the choice of solvent will depend on the reactivity of the molybdenum and tungsten compounds, for example that protic polar solvents are not used if substitution reactions, such as replacement of halogen by alkoxy, are to be expected.

Suitable inert solvents are typically protic polar and aprotic solvents, which can be used by themselves or in mixtures of at least two solvents. Examples of such solvents are: ethers (dibutyl ether, tetrahydrofuran, dioxane, ethylene glycol monomethyl or dimethyl ether, ethylene glycol monoethyl or diethyl ether, diethylene glycol diethyl ether and triethylene glycol dimethyl ether), halogenated hydrocarbons (methylene chloride, chloroform, 1,2-dichloroethane, 1,1,1-trichloroethane and 1,1,2,2-tetrachloroethane), carboxylates and lactones (ethyl acetate, methyl propionate, ethyl benzoate, 2-methoxyethyl acetate, γ-butyrolactone, δ-valerolactone, pivalolactone), carboxamides and lactams (N,N-dimethylformamide, N,N-diethylformamide, N,N-dimethylacetamide, tetramethylurea, hexamethyl phosphoric triam, γ-butyrolactam, ε-caprolactaon, N-methylpyirolidone, N-acetylpyrrolidone, N-methylcaprolactam), sutfoxides (dimethyl sulfoxide), sulfones (dimethyl sulfone, diethyl sulfone, triethylene sulfone, tetraethylene sulfone), tertiary amines (N-methylpiperidine, N-methylmorpholine), aliphatic and aromatic hydrocarbons, for example petroleum ether, pentane, hexane, cyclohexane, methylcyclohexane, benzene or substituted benzenes (chiorobenzene, o-dichlorobenzene, 1,2,4-trichiorobenzene, nitrobenzene, toluene, xylene) and nitrfles (acetonitrile, propionitrile, benzonitrile, phenylacetonitrile). Preferred solvents are aprotic polar and non-polar solvents.

Preferred solvents are aliphatic and aromatic hydrocarbons and mixtures of such solvents.

It is to be particularly highlighted that that the compositions used in the practice of this invention comprising a n unsubstituted or s ubstituted cycloolefin and catalyst are often insensitive to oxygen, thereby permitting storage and also the reaction to be carried out without an inert gas. It is, however, advisable to exclude atmospheric moisture, i.e. to use dry reaction and storage conditions.

The monomers of formula I and catalysts used for the inventive process can be stored separately as well as together as mixture, as the catalyst has a particularly high stability. The mixture can be stored prior to the photochemical polymerisation as ready-for-use formulation, which is advantageous for the large-scale industrial application of the inventive process. Owing to its high photosensitivity, the formulation is stored in particular under UV light, preferably with exclusion of atmospheric moisture.

In another of its aspects, the invention relates to a photopolymerisable composition comprising a cyclic olefin, or at least two different cyclic olefins, and a catalytically effective amount of at least one thermostable molybdenum (VI) or tungsten (VI) compound which contains at least two methyl groups or two monosubstituted methyl groups lacking β-hydrogen atoms in the substituent and which are bonded to the metal atom.

The inventive composition may contain formulation assistants, suitably those compounds listed above as solvents. Known formulation assistants are plasticisers, dyes, pigments, fillers, reinforcing fillers, lubricants and mould release agents.

It is not necessary in the inventive process to maintain the irradiation of the reaction mixture over the entire duration of the reaction. Once the polymerisation has been photochemically initiated, the further reaction course proceeds by itself even in the dark. The irradiation time will depend on the type of light source employed. It is preferred to use UV lasers or UV lamps in the inventive process. Irradiation of the catalyst can be effected before, during and also after the addition of the monomers.

Suitable irradiation times are from one minute to 8 hours, in particular from 5 minutes to 4 hours. The sequence of the addition of monomers and catalyst is not critical. The monomer can either be initially introduced into the reactor or added after introduction of the catalyst. Likewise, the catalyst can be irradiated beforehand and then added to the monomer. Furthermore, the solution comprising catalyst and monomer can also be irradiated.

The inventive process is preferably carried out at room temperature to slightly elevated temperature. An increase in temperature serves to increase the reaction rate. Only in exceptional cases do the catalysts themselves initiate a thermal polymerisation. Therefore mainly a photopolymerisation takes place at the temperatures chosen for the catalysis. It should be mentioned, however, that the catalysts can be converted into thermoactive catalysts by sufficient irradiation.

It is preferred to carry out the inventive process in the temperature range from −20° to +110° C.

A particular and surprising advantage of the inventive process is that the molybdenum and tungsten compounds employed act as thermal catalysts after irrdiation. This feature results in the possibility of continuing and terminating the polymerisation after a brief irradiation time by applying heat, thereby affording economic and technical advantages in different fields in the fabrication of moulded objects or coatings. The combined process is particularly suitable for the preparation of thermoplastics.

The invention further relates to a process for the photocatalytic polymerisation of a cyclic olefin, or at least two different cyclic olefins, in the presence of a metal compound as catalyst, which process comprises
a) initially irradiating the cycloolefins in the presence of a catalytic amount of at least one thermostable molybdenum (VI) or tungsten (VI) compound which contains at least two methyl groups or two monosubstituted methyl groups lacking β-hydrogen atoms in the substituent and which are bonded to the metal atom; or irradiating a catalytic amount of at least one thermostable molybdenum (VI) or tungsten (VI) compound which contains at least two methyl groups or two monosubstituted methyl groups lacking β-hydrogen atoms in the substituent and which are bonded to the metal atom, without a solvent or in an inert solven, and then mixing the catalyst with at least one cycloolefin; and
b) terminating the polymerisation by heating and without irradiation.

The preferences defined above apply to process stage a). The irradiation time essentially depends on the desired reaction procedure. A brief irradiation is chosen if, for example, the polymerisation is to be only initiated by irradiation and terminated by heating. Brief may be an irradiation time of up to 60 seconds, preferably 5 to 60 seconds and, most preferably, 10 to 40 seconds. A longer irradiation time may be chosen if, for example, the polymerisation is to be carried out mainly by irradiation and the final polymerisation is to be terminated only by subsequent heating.

Heating in process stage b) may be a reaction temperature in the range from 50° to 200° C., preferably from 50° to 150° C. and, most preferably, from 70° to 120° C.

Catalytic amounts within the scope of this invention preferably mean an amount of 0.001 to 20 mol %, more particularly 0.01 to 15 mol % and, most preferably, 0.1 to 10 mol %, based on the amount of monomer, A further object of the invention is a process for the preparation of thermal catalysts for the ring-opening metathesis polymerisation of cyclic olefins, which comprises irradiating a thermostable molybdenum (VI) or tungsten (VI) compound that contains at least two methyl groups or two monosubstituLed methyl groups lacking β-hydrogen atoms in the substituent and which are bonded to the metal atom, without a solvent or in a solvent.

Cyclohexene usually cannot be homopolymerised by olefin metathesis. Those skilled in the art are familiar with this exception, which is described, inter alia, in K. J. Ivin, T. Saegusa, Ring-Opening Polymerisadon Yolume 1, page 139, Elsevier Applied Science Publishers, London and N.Y.

By the inventive process radiation-cured oligomers and polymers can be prepared having identical or different structural units of formula IX

(IX)

wherein
$Q_1$ and $Q2$ are as defined for formula I.

The preferences defined above apply to these polymers. They can be homopolymers or copolymers having a random distribution of the structural units, or block polymers. They can have an average molecular weight (Mw) of, for example, 500 to 2,000,000 dalton, preferably 1000 to 1,000,000 dalton (determined by GPC in comparison with a polystyrene standard of narrow distribution).

Thermoplastical materials for the fabrication of moulded articles of all types, coatings and relief images can be prepared by the process according to the invention.

The polymers of this invention can have very different properties, depending on the monomer used. Some are distinguished by a very high oxygen permeability, low dielectric constant, good heat stability and low water absorption. Others have outstanding optical properties, for example high transparency and low refractive indices. The low shrinkage is furthermore to be highlighted. They can therefore be used in widely different industrial fields.

The compositions of the invention are distinguished by superior bonding strength to the surfaces of substrates. The coated materials are also distinguished by very good surface smoothness and gloss. Among the good mechanical properties, the low shrinkage and high impact strength are to be singled out for special mention, as well as the heat resistance. Easy mould removal and good resistance to solvents also merit mention.

These polymers are suitable for the production of medical equipment, implants or contact lenses; for the production of electronic components; as binders for paints; as photocurable compositions for model construction or as adhesives for bonding to substrates having low surface energy (for example Teflon, polyethylene and polypropylene), and as a photopolymerisable composition in stereolithography. The compositions of the invention can also be used for the production of paints by photopolymerisation, for which utility clear (transparent) and even pigmented compositions to be used. Either white or coloured pigments can be used. The production of moulded objects of all types by thermoplastic shaping processes may also be mentioned.

The photocurable compositions of the invention are particularly suitable for the production of protective layers and relief images. The invention furthermore relates to a variant of the process of the invention for the production of coated materials or relief images on substrates, comprising applying a composition of cyclic olefin, catalyst and, in some cases, solvent, as a layer to a substrate, for example by dipping, brushing, casting, rolling, knife-coating or spin-coating processes, removing the solvent, if used, and irradiating the layer to effect polymerisation, or irradiating the layer through a photo-mask and then removing non-irradiated portions with a solvent. Surfaces of substrates can be modified or protected or, for example, printed circuits, printing plates or printing rollers can be produced by this process. In the production of printed circuits, the compositions odf the invention can also be used as solder resists. Other possible utilities are the production of screen printing masks and use as radiation-curing printing inks for offset, screen and flexographic printing.

The present invention further relates to a substrate which is coated with an oligomer or polymer prepared according to the invention and which comprises a crosslinking agent. These materials are suitable for the production of protective coatings or relief images by irradiation (usually through a photomask) and subsequent development with a solvenl Suitable crosslining agents which may be present in the materials in an amount of 0.01 to 20% by weight, are preferably organic bisazides, more particularly the commercially available 2,6bis(4azidobenzylidene) 4methylcyclohexanone.

The invention further relates to a coated substrate having applied thereto a layer of at least one cyclic olefm which contains a catalytic amount of at least one thermostable molybdenum (VI) or tungsten (VI) compound that contains at least two methyl groups or two monosubstituted methyl groups lacking β-hydrogen atoms in the substituent and which are bonded to the metal atom.

The invention likweise relates to a coated substrate having thereon a radiation-cured layer of at least one cyclic olefin.

Suitable substrates are typically those of glass, minerals, ceramics, plastics, wood, metals, metal oxides and metal nitrides. The layer thicknesses will essentially depend on the desired use, and may be 0.1 to 1000 μm, preferably 0.5 to 500 μm, most preferably 1 to 100 μm. The coated materials have superior bonding strength and good thermal and mechanical properties.

The coated materials can be prepared by known methods such as brushing, knife-coating, and casting methods such as curtain coating or spin-coating.

Particularly good coating results are obtained by using for the photometathesis polymerisation cycloolefins that additionally contain three and preferably one further double bond and which, within the scope of the invention, constitute fused ring systems, or if they have the formula

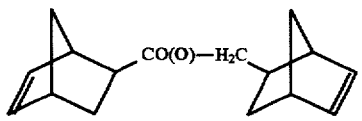

The following Examples illustrate the invention in more detail. The light source used is a 200 W mercury mediumpressure UV lamp (Osram HBO 200 W/2, supplied by Spindler & Hoyer, Göttingen) or a UV laser (Coherent 300 Argon Laser).

EXAMPLE 1:

Polymerisation of norbornene 1 ml of a 0.5% solution of $W(=NC_6H_5)[OC(CH_3)_3](Cl)$ $[(CH_2Si(CH_3)_3]_2$ (=5 mg) in toluene is charged to a Schlenk reactor. Then 6 ml of a 10% solution of norbornene in toluene are added and the reactor is closed. With stirring, the mixture is irradiated with a UV laser (0.5 watt) for 5 minutes. After about 15 seconds a rise in viscosity is observed. The reaction is discontinued after 5 minutes by addition of one drop of benzaldehyde and the reaction mixture is poured into 100 ml of ethanol. The precipitated polymer is filtered, washed with ethanol and then dried under vacuum. The polymer is obtained in quantitative yield and characterised by gel permeation chromatography [GPC; solvent tetrahydrofuran; the number average ($M_n$) and weight average ($M_w$) molecular weights are determined relative to polystyrene reference standards] and $^1$H-NMR (Bruker 300 MHz; solvent CDCl$_3$): $M_n$=88 000 g/mol (88 k), $M_w$=340 000 g/mol (340 k); the content of cis-double bond is 90%.

An identical experiment without exposure at 45° C. shows no rise in viscosity and no polymer precipitates after addition of ethanol.

EXAMPLE 2:

The procedure of Example 1 is repeated, except for the further addition of 8 mg (0.036 mmol) of 2,6-di-(tertiarybutyl)-p-cresol. The same results are obtained as in Example 1, i.e. the polymerisation is not adversely affected by phenolic antioxidants. It is therefore possible to incorporate antioxidants as processing and protective stabilisers in the polymers during the polymerisation.

EXAMPLE 3:

Production of a Moulded Object by Stereolithography

An apparatus is used with which a three-dimensional object is produced from cubes of differing thickness connected to one another by strands by means of layered polymerisation using a focused computer-controlled laser beam (argon laser, 351 nm). A mixture of 99% by weight of exo,exo-dicyclopentadiene and 1% by weight of $W(=NC_6H_5)[OC(CH_3)_3](Cl)[(CH_2Si(CH_3)_3]_2$ are used. A mechanically stable moulded object characterised by excellent freedom from stress is obtained at an irradiation intensity of 20–60 mJ/cm$^2$ and with a laser beam penetration depth of 0.1–0.2 mm.

EXAMPLE 4:

Determination of Shrinkage

The mixture of Example 2 is applied in a layer thickness of 50 μm and a dimension of 6 mm to a glass slide which is bonded to a silver-coated cover glass. The shrinkage caused by the polymerisation results in warping of the cover glass. The warp can be determined interferometrically in a Michelson interferometer by a helium-neon laser. The irradiation is made with an argon UV laser at 351 nm and at an intensity of 0.2 W/cm$^2$. After irradiation, the layer thickness is measured and the absolute shrinkage is calculated as a function of the irradiated energy. The shrinkage after irradiation for 30 seconds (6 J/cm$^2$) is only 1 to 2%, whereas commercial photopolymer formulations under the same conditions exhibit a shrinkage of 5 to 8%.

EXAMPLES 5 to 23:

The procedure of Example 1 is repeated. The process conditions and results are shown in Table 1. The following catalysts are used:

A=W(N-phenyL)[OC(CH$_3$)$_3$][CH$_2$Si(CH$_3$)$_3$]$_2$Cl
B=W(N-phenyL)[OCCH$_3$(CF$_3$)2]$_2$[CH$_2$Si(CH$_3$)$_3$]$_2$
C=W(N-2,6-dimethylphenyl)(3,5-dimethylphenyl-O)[CH$_2$Si(CH$_3$)$_3$]$_2$Cl
D=W(N-2,-dimethylphenyl)$_2$(CH$_2$-phenyl)$_2$
E=Mo(N-2,6-dimethylphenyl)$_2$(CH$_2$-phenyl)$_2$
F=Mo(N-2,6diisipropylphenyl)$_2$[CH$_2$—C(CH$_3$)$_2$phenyl]$_2$
G=[(CH$_3$)$_3$SiCH$_2$]$_3$MoMo[CH$_2$Si(CH$_3$)$_3$]$_3$ H=W(NC$_6$H$_5$)(3,5-dimethylphenyl-O)[CH$_2$Si(CH$_3$)$_3$]$_2$Cl
I=Mo(N-2,6-diisipropylphenyl)$_2$(CH$_2$-phenyl)2
J=Mo(N-2,6-dimethylphenyl)$_2$(CH$_3$)$_2$·(tetrahydrofuran)
K=W(NC$_6$H$_5$)[CH$_2$Si(CH$_3$)$_3$]$_3$Cl The following monomers are used:

(1) 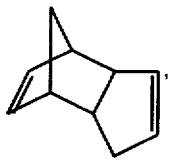

(2) 

(3) 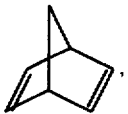

(4) 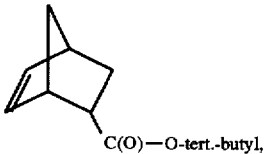
C(O)—O-tert.-butyl, (5) 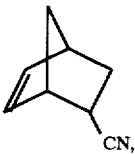
CN, (6) 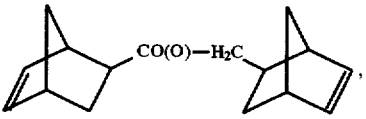
CO(O)—H$_2$C (7) 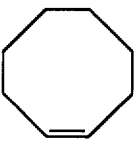

and (8) 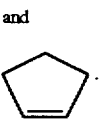

EXAMPLES 24–30:

These examples are carried out as in examples 5–23. The results are shown in Table 2.

Key to Tables 1 and 2:
[1])after reprecipitation in CHCl$_3$/EtOH,
[2]) RT=room temperature
[3]) argon UV laser (0.5 W)
[4]) after reprecipitation in toluene/methanol Key to Tables 3 to 5:
[5])2,6-di-tert-butyl-4-methylphenol
[6])impact strength (Charpy)
[7])after crosslinking at 250° C.

EXAMPLES 31 to 39:

Mechanical Properties of Castings

Standard castings for determining mechanical properties are fabricated from the photopolymerisable compositions containing a catalyst and which are listed in Table 2 and polymerised by irradiation and then subjected to an optional thermal postcure. The radiation sources are (a) a self-constructed UV oven with 4 X 40 W R-UAV lamps TL, K 40 W/10/R and 2×20 W TL 20 W/05 (Philips) at a distance of about 25 cm, and (b) a 200 W mercury medium-pressure UV lamp (OsramF HBO 200 W/2). The curing conditions are indicated in Table 3. Modulus of elasticity (tensile test), fracture strength and flexural elongation are determined in accordance with ISO 527/66 (Type 2). The notched impact strength is determined according to ISO 179/82, Method C, and the impact strength is determined according to ISO 179/2D (Charpy method); the modulus of elasticity (flexural test) is determined with an Instrone machine. The contact angle is determined with a microscope goniometer. The Shore D hardness is determined with a commercially available Shore D apparatus; swelling is determined by immersing the casting in toluene at room temperature and measuring the weight increase of the dried specimen as a function of the time.

The following monomers are used:

(1) 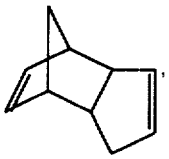

(3) 

and (9) 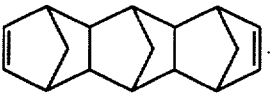

The results are reported in Tables 3 to 5.

TABLE 1

| Example No. | Monomer; amount | Catalyst; amount | Solvent; amount | Exposure time at 25° C. | Holding-time before processing; temperature | Yield (%) | Molecular weight (GPC, g/mol) |
|---|---|---|---|---|---|---|---|
| 5 | 1; 10g | A; 100 mg | (without) | 10 min | 1 h; 80° C. | 100 | crosslinked |
| 6 | 1; 0.3 g | A; 6 mg | toluene; 1 ml | (ohne Belichtung) | 14 h; 45° C. | 0 | — |
| 7 | 2; 1 g | A; 5 mg | toluene; 10 ml | 2 min | 3 Min; RT[2] | 60.1[1] | $M_n$ = 500k; $M_w$ = 2000k |
| 8 | 2; 0.3 g | A; 6 mg | toluene; 1 ml | 5 min | 14 h; 45° C. | 100 | $M_n$ = 270k; $M_w$ = 1900k |
| 9 | 2; 0.3 g | B; 6 mg | toluene; 1 ml | 5 min | 14 h; 45° C. | 61.8 | crosslinked |
| 10 | 2; 0.3 g | C; 6 mg | toluene; 1 ml | 5 min | 2 h; 45° C. u. 48 h; RT | 68.5 | crosslined |
| 11 | 2; 0.3 g | D; 6 mg | toluene; 1 ml | 5 min | 2 h; 45° C. u 48 h; RT | 0.8 | crosslinked |
| 12 | 2; 0.3 g | E; 6 mg | toluene; 1 ml | 5 min | 14 h; 45° C. | 36.4 | $M_n$ = 100k; $M_w$ = 150k |
| 13 | 2; 0.5 g | F; 15 mg | toluene; 5 ml | 10 min | 14 h; 50° C. | 21.0 | — |
| 14 | 2; 0.6 g | G; 4 mg | hexane; 6 ml | 5 min[3] | 2 h; RT | 21.7 | $M_n$ = 3,7k; $M_w$ = 5,3k |
| 15 | 2; 0.3 g | G; 6 mg | toluene; 1 ml | 5 min | 14 h; 45° C. | 43.0 | $M_n$ = 100k; $M_w$ = 480k |
| 16 | 3; 0.82 g | A; 5 mg | toluene; 10 ml | 2 min | 5 min; RT | 26.2 | crosslinked |
| 17 | 3; 0.3 g | A; 6 mg | toluene; 1 ml | 5 min | 14 h; 45° C. | 2.8 | crosslinked |
| 18 | 3; 0.3 g | D; 6 mg | toluene; 1 ml | 5 min | 2 h; 45° C. u. 48 h; RT | 0.3 | — |
| 19 | 3; 0.3 g | E; 6 mg | toluene; 1 ml | 5 min | 14 h; 45° C. | 64.6 | crosslinked |
| 20 | 3; 0.3 g | G; 6 mg | toluene; 1 ml | 5 min | 14 h; 45° C. | 21.7 | crosslinked |
| 21 | 4; 0.67 g | D; 30 mg | toluene; 10 ml | 5 min | 14 h; RT | 93.9 | crosslinked |
| 22 | 5; 1 g | A; 5 mg | toluene; 10 ml | 5 min | 15 min; RT | 17.2 | $M_n$ = 4k; $M_w$ = 8k |
| 23 | 6; 0.3 g | A; 6 mg | (without) | 5 min | 14 h; 45° C. | 2.6 | crosslinked |

TABLE 2

| Example No. | Monomer; amount | Catalyst; amount | Solvent; amount | Exposure time at 25° C. | Holding-time before processing; temperature | Yield (%) | Molecular weight (GPC, g/mol) |
|---|---|---|---|---|---|---|---|
| 24 | 2; 0.1 g | H; 4 mg | toluene; 5 ml | 10 min | 3 h; 50° C., 48 h RT | 100 | $M_n$ = 780k |
| 25 | 2; 0.61 g | I; 3 mg | toluene; 5 ml | 10 min | 3 h; 50° C., 48 h RT | 6 | $M_n$ = 18,1K |
| 26 | 2; 0.32 g | J; 3 mg | toluene; 5 ml | 10 min | 3 h; 50° C., 48 h RT | 38 | $M_n$ = 100k; $M_w$ = 430k |
| 27 | 2; 0.29 g | K; 2 mg | toluene; 5 ml | 10 min | 3 h; 50° C., 48 h RT | 100 | $M_n$ = 110k; $M_w$ = 700k |
| 28 | 7; 1.7 g | B; 10 mg | (without) | 10 min | 14 h; 60° C. | 79.4[4] | 180k |
| 29 | 8; 1.54 g | B; 10 mg | (without) | 1 min | 14 h; RT | 27.9[4] | 40k |
| 30 | 8; 1.54 g | A; 10 mg | (without) | 1 min | 14 h; RT | 1.9[4] | 110 |

TABLE 3

| Ex. No. | Monomer | Catalyst | Curing conditions | Shrinkage (%) | Density (g/cm³) |
|---|---|---|---|---|---|
| 31 | 1 | A, 1.2 % by wt | 15 min UV(a) RT, 90 min 50° C. | 6.7 | 1.05 |
| 32 | 1 | A, 1.0 5 by wt | 10 min UV(a) RT, 1 h 80° C. | 6.7 | 1.05 |
| 33 | 1 | A, 1.4 5 by wt | 30 min UV(a) RT, 40 min 50° C., 30 min 80° C. | 4.9 | 1.03 |
| 34 | 1 | A, 0.7% by wt | 4 h UV(a) RT, 1 h 80° C., 1 h 100° C., 30 min 120° C. | | |
| 35 | 1 | B, 1.0% by wt | 2 h UV(a) RT, 30 min 50° C., 45 min 80° C., 45 min 100° C., | 5.7 | 1.04 |
| 36 | 1/BHT[5] (1%) | B, 1.0% by wt | 2 h UV(a) RT, 30 min 80° C., 30 min 100° C., 30 min 120° C. | | |
| 37 | 9 | A, 0.7% by wt | 30 min UV(a) RT, 1 h 80° C. | | |
| 38 | 1 (84% by wt); 3 (16% by wt) | B, 1.0% by wt | 2 h UV(a) RT, 30 min 50° C. 45 min 80° C. 45 min 100° C. | | 1.03 |
| 39 | 1 (81% by wt); 3 (19% by wt) | B, 1.0% by wt | 2 h UV(a) RT, 30 min 50° C., 45 min 80° C., 45 min 100° C., 45 min 130° C. | | 1.02 |

TABLE 4

| Ex. | Tg (°C.) | Modulus of elasticity Tensile test (N/mm²) | Fracture strength (N/mm²) | Flexural elongation (%) | Modulus of elasticity Flexural test (N/mm²) |
|---|---|---|---|---|---|
| 31 | 30 | 384 ± 15 | 5.5 | 2.0 ± 0.5 | 207 |
| 32 | 85 | | | | 1654 |
| 33 | 90 | 1923 ± 26 | 41.8 ± 1.3 | 6.0 ± 0.8 | |
| 34 | | | | | |
| 35 | 121 | 1918 ± 20 | 31.8 ± 1.3 | 1.9 ± 0.1 | 1560 |
| 36 | 130 | | | | |
| 37 | 62 | | | | |
| 38 | 123 | 1669 | 30.8 | 2.3 | 1830 |
| 39 | 113 | 1815 ± 11 | 39.6 ± 1.5 | 2.9 ± 0.4 | |

TABLE 5

| Ex. No. | Notched impact strength (Charpy) (kJ/m²) | Swelling in toluene | Crosslinking density | Shore D hardness | Contact angle with water |
|---|---|---|---|---|---|
| 31 | 29.2 ± 1.1 | 230% | | 64–70 | 65–72° |
| 32 | | 190% | ca. 7% | 65 | 65–72° |
| 33 | 24.2 ± 3.0 | 130% | | | |
| 34 | | 450% | | | |
| 35 | 2.84 ± 0.55[6] | 1300–1600% | ca. 0.4% | 80 | |
| 36 | | >1400% | | | |
| 37 | | 52% | | | |
| 38 | 3.21 ± 0.10[6] | 700% (236%)[7] | ca 1% (ca 14%)[7] | 77 | |
| 39 | 17.7 ± 10.1[6] | 220% | | 81 | |

What is claimed is:

1. A process for photocatalytic polymerization of a cyclic olefin or of at least two different cyclic olefins in the presence of a metal compound as catalyst, which process comprises carrying out a photochemically induced ring-opening metathesis polymerization in the presence of a catalytic amount of at least one thermostable molybdenum (VI) or tungsten (VI) compound that contains at least two methyl groups or two monosubstituted methyl groups lacking β-hydrogen atoms in the substituent which are bonded to the metal atom.

2. A process according to claim 1, wherein the cyclic olefins are condensed systems containing two to four rings and which are unsubstituted or substituted and contain hetero atoms selected from the group consisting of O, S, N and Si in one or more than one ring, and which contain one or more than one fused aromatic or heteroaromatic ring.

3. A process according to claim 2, wherein the rings contain 3 to 16 ring atoms.

4. A process according to claim 3, wherein the rings contain 3 to 12 ring atoms.

5. A process according to claim 2, wherein the cyclic olefins contain further non-aromatic double bonds.

6. A process according to claim 1, wherein the cycloolefins have the formula I

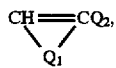

(I)

wherein $Q_1$ is a radical having at least one carbon atom which, together with the —CH=$CQ_2$— group, forms an at least 3-membered alicyclic ring which may contain one or more hetero atoms selected from the group consisting of silicon, phosphorus, oxygen, nitrogen and sulfur, and selected from the group consisting of silicon, phosphorus, oxygen, nitrogen and sulfur, and which radical is unsubstituted or substituted by halogen, =O, —CN, —$NO_2$, $R_1R_2R_3Si$—$(O)_u$—, —COOM, —$SO_3M$, —$PO_3M$, —COO$(M_1)_{1/2}$, —$SO_3(M_1)_{1/2}$, —$PO_3(M_1)_{1/2}$, $C_1$–$C_{20}$alkyl, $C_1$–$C_{20}$hydroxyalkyl, $C_1$–$C_{20}$haloalkyl, $C_1$–$C_6$cyanoalkyl, $C_3$–$C_8$cycloalkyl, $C_6$–$C_{16}$aryl, $C_7$–$C_{16}$aralkyl, $C_3$–$C_6$heterocycloalkyl, $C_3$–$C_{16}$heteroaryl, $C_4$–$C_{16}$heteroaralkyl or $R_4$—X—; or in which two adjacent C atoms are substituted by —CO—O—CO— or —CO—$NR_5$—CO—; or in which an aromatic or heteroaromatic ring, which is unsubstituted or substituted by halogen, —CN, —$NO_2$, $R_6R_7R_8Si$—$(O)_u$—, —COOM, —$SO_3M$, —$PO_3M$, —COO$(M_1)_{1/2}$, —$SO_3(M_1)_{1/2}$, —$PO_3(M_1)_{1/2}$, $C_1$–$C_{20}$alkyl, $C_1$–$C_{20}$haloalkyl, $C_1$–$C_{20}$hydroxyalkyl, $C_1$–$C_6$cyanoalkyl, $C_3$–$C_8$cycloalkyl, $C_6$–$C_{16}$aryl, $C_7$–$C_{16}$aralkyl, $C_3$–$C_6$heterocycloalkyl, $C_3$–$C_{16}$heteroaryl, $C_4$–$C_{16}$heteroaralkyl or $R_{13}$—$X_1$—, is fused to adjacent carbon atoms of the alicyclic ring;

X and $X_1$ are each independently of the other —O—, —S—, —CO—, —SO—, —$SO_2$—, —O—C(O)—, —C(O)—O—, —C(O)—$NR_5$—, —$NR_{10}$—C(O)—, —$SO_2$—O— or —O—$SO_2$—;

$R_1$, $R_2$ and $R_3$ are each independently of one another $C_1$–$C_{12}$alkyl, $C_1$–$C_{12}$perfluoroalkyl, phenyl or benzyl;

$R_4$ and $R_{13}$ are each independently of the other $C_1$–$C_{20}$alkyl, $C_1$–$C_{20}$haloalkyl, $C_1$–$C_{20}$hydroxyalkyl, $C_3$–$C_8$cycloalkyl, $C_6$–$C_{16}$aryl or $C_7$–$C_{16}$aralkyl;

$R_5$ and R are each independently of the other hydrogen, $C_1$–$C_{12}$alkyl, phenyl or benzyl, the alkyl groups in turn being unsubstituted or substituted by $C_1$–$C_{12}$alkoxy or $C_3$–$C_8$cycloalkyl;

$R_6$, $R_7$ and $R_8$ are each independently of one another $C_1$–$C_{12}$alkyl, $C_1$–$C_{12}$perfluoroalkyl, phenyl or benzyl;

M is an alkali metal and $M_1$ is an alkaline earth metal; and u is 0 or 1;

and the alicyclic ring formed with $Q_1$ may contain further non-aromatic double bonds;

$Q_2$ is hydrogen, $C_1$–$C_{20}$alkyl, $C_1$–$C_{20}$haloalkyl, $C_1$–$C_{12}$alkoxy, halogen, —CN or $R_{11}$—$X_2$—;

$R_{11}$ is $C_1$–$C_{20}$alkyl, $C_1$–$C_{20}$haloalkyl, $C_1$–$C_{20}$hydroxyalkyl, $C_3$–$C_8$cycloalkyl, $C_6$—$C_{16}$aryl or $C_7$–$C_{16}$aralkyl;

$X_2$ is —C(O)—O— or —C(O)—$NR_{12}$—;

$R_{12}$ is hydrogen, $C_1$–$C_2$alkyl, phenyl or benzyl.

7. A process according to claim 6, wherein the alicyclic ring that $Q_1$ forms together with the —CH=$CQ_2$— group contains 3 to 16 ring atoms, which ring system may be monocyclic, bicyclic, tricyclic or tetracyclic.

8. A process according to claim 6, wherein $Q_2$ in formula I is hydrogen.

9. A process according to claim 6, wherein in formula I $Q_1$ is a radical having at least one carbon atom which, together with the —CH=$CQ_2$— group, forms a 3- to 20-membered alicyclic ring which may contain one or more hetero atoms selected from the group consisting of silicon, oxygen, nitrogen and sulfur, which radical is unsubstituted or substituted by halogen, =O, —CN, —$NO_2$, $R_1R_2R_3Si$—$(O)_u$—, —COOM, —$SO_3M$, —$PO_3M$, —COO$(M_1)_{1/2}$, —$SO_3(M_1)_{1/2}$, —$PO_3(M_1)_{1/2}$, $C_1$–$C_{12}$alkyl, $C_1$–$C_{12}$haloalkyl, $C_1$-$C_{12}$hydroxyalkyl, $C_1$-$C_4$cyanoalkyl, $C_3$-$C_6$cycloalkyl, $C_6$-$C_{12}$aryl, $C_7$-$C_{12}$aralkyl, $C_3$-$C_6$heterocycloalkyl, $C_3$-$C_{12}$heteroaryl, $C_4$-$C_{12}$heteroaralkyl or $R_4$—X—; or two adjacent carbon atoms in said radical $Q_1$ are substituted by —CO—O—CO— or —CO—$NR_5$—CO—; or an aromatic or heteroaromatic ring which is unsubstituted or substituted by halogen, —CN, —$NO_2$, $R_6R_7R_8Si$—, —COOM, —$SO_3$M, —$PO_3$M, —COO($M_1$)$_{1/2}$, —$SO_3$($M_1$)$_{1/2}$, —$PO_3$($M_1$)$_{1/2}$, $C_1$-$C_{12}$alkyl, $C_1$-$C_{12}$haloalkyl, $C_1$-$C_{12}$hydroxyalkyl, $C_1$-$C_4$cyanoalkyl, $C_3$-$C_6$cycloalkyl, $C_6$-$C_{12}$aryl, $C_7$-$C_{12}$araLkyl, $C_3$-$C_6$heterocycloalkyl, $C_3$-$C_{12}$heteroaryl, $C_4$-$C_2$heteroaralkyl or $R_{13}$—$X_1$— can be fused to adjacent carbon atoms;

X and $X_1$ are each independently of the other —O—, —S—, —CO—, —SO—, —$SO_2$—, —O—C(O)—, —C(O)—O—, —C(O)—$NR_5$—, —$NR_{10}$—C(O)—, —$SO_2$—O— or —O—$SO_2$—; and $R_1$, $R_2$ and $R_3$ are each independently of one another $C_1$-$C_6$alkyl, $C_1$-$C_6$perfluoroalkyl, phenyl or benzyl;

M is an alkali metal and $M_1$ is an alkaline earth metal;

$R_4$ and $R_{13}$ are each independently of the other $C_1$-$C_{12}$alkyl, $C_1$-$C_{12}$haloalkyl, $C_1$-$C_{12}$hydroxyalkyl, $C_3$-$C_8$cycloalkyl, $C_6$-$C_{12}$aryl or $C_7$-$C_{12}$aralkyl;

$R_5$ and $R_{10}$ are each independently of the other hydrogen, $C_1$-$C_6$alkyl, phenyl or benzyl, the alkyl groups in turn being unsubstituted or substituted by $C_1$-$C_6$alkoxy or $C_3$-$C_6$cycloalkyl;

$R_6$, $R_7$ and $R_8$ are each independently of one another $C_1$-$C_6$alkyl, $C_1$-$C_6$perfluoroalkyl, phenyl or benzyl;

u is 0 or 1;

and the alicyclic ring formed with $Q_1$ may contain further non-aromatic double bonds;

$Q_2$ is hydrogen, $C_1$-$C_{12}$alkyl, $C_1$-$C_{12}$haloalkyl, $C_1$-$C_6$alkoxy, halogen, —CN or $R_{11}$—$X_2$—;

$R_{11}$ is $C_1$-$C_{12}$alkyl, $C_1$-$C_{12}$halogalkyl, $C_1$-$C_{12}$hydroxyalkyl, $C_3$-$C_6$cycloalkyl, $C_6$-$C_{12}$aryl or $C_7$-$C_{12}$aralkyl;

$X_2$ is —C(O)—O— or —C(O)—$NR_{12}$—; and $R_{12}$ is hydrogen, $C_1$-$C_6$alkyl, phenyl or benzyl;

and the cycloalkyl, heterocycloalkyl, aryl, heteroaryl, aralkyl and hetemaralkyl groups are unsubstituted or substituted by $C_1$-$C_6$alkyl, $C_1$-$C_6$alkoxy, —$NO_2$, —CN or halogen, and the hetero atoms of the heterocycloalkyl, heteroaryl and heteroaralkyl groups are selected from the group consisting of —O—, —S—, —$NR_9$— and —N=; and $R_9$ is hydrogen, $C_1$-$C_6$alkyl, phenyl or benzyl.

10. A process according to claim 6, wherein in formula I $Q_1$ is a radical having at least one carbon atom which, together with the —CH=$CQ_2$— group, forms a 3- to 10-membered alicyclic ring which may contain a hetero atom selected from the group consisting of silicon, oxygen, nitrogen and sulfur, and which radical is unsubstituted or substituted by halogen, —CN, —$NO_2$, $R_1R_2R_3Si$—, —COOM, —$SO_3$M, —$PO_3$M, —COO($M_1$)$_{1/2}$, —$SO_3$($M_1$)$_{1/2}$, —$PO_3$($M_1$)$_{1/2}$, $C_1$-$C_6$alkyl, $C_1$-$C_6$haloalkyl, $C_1$-$C_6$hydroxyalkyl, $C_1$-$C_4$cyanoalkyl, $C_3$-$C_6$cycloalkyl, phenyl or $R_4$—X—; or an aromatic or heteroaromatic ring which is unsubstituted or substituted by halogen, —CN, —$NO_2$, $R_6R_7R_8Si$—, —COOM, —$SO_3$M, —$PO_3$M, —COO($M_1$)$_{1/2}$, —$SO_3$($M_1$)$_{1/2}$, —$PO_3$($M_1$)$_{1/2}$, $C_1$-$C_6$alkyl, $C_1$-$C_6$haloalkyl, $C_1$-$C_6$hydroxyalkyl, $C_1$-$C_4$cyanoalkyl, $C_3$-$C_6$cycloalkyl, phenyl, benzyl or $R_{13}$—$X_1$— can be fused to adjacent carbon atoms;

$R_1$, $R_2$ and $R_3$ are each independently of one another $C_1$-$C_4$alkyl, $C_1$-$C_4$perfluoroalkyl, phenyl or benzyl;

M is an alkali metal and $M_1$ is an alkaline earth metal;

$R_4$ and $R_{13}$ are each independently of the other $C_1$-$C_6$alkyl, $C_1$-$C_6$haloalkyl, $C_1$-$C_6$hydroxyalkyl or $C_3$-$C_6$cycloalkyl;

X and $X_1$ are each independently of the other —O—, —S—, —CO—, —SO— or —$SO_2$—;

$R_6$, $R_7$ and $R_8$ are each independently of one another $C_1$-$C_4$alkyl, $C_1$-$C_4$perfluoroalkyl, phenyl or benzyl; and $Q_2$ is hydrogen.

11. A process according to claim 1, wherein the cyclic olefin is a norbornene or norbornene derivative.

12. A process according to claim 11, wherein the norbornene derivative is a compound of formula II

wherein $X_3$ is —$CHR_{16}$—, oxygen or sulfur, $R_{14}$ and $R_{15}$ are each independently of the other hydrogen, —CN, trifluoromethyl, $(CH_3)_3Si$—O—, $(CH_3)_3Si$— or —$COOR_{17}$; and $R_{16}$ and $R_{17}$ are each independently of the other hydrogen, $C_1$-$C_{12}$alkyl, phenyl or benzyl.

13. A process according to claim 11, wherein the norbornene derivative is a compound of formula III

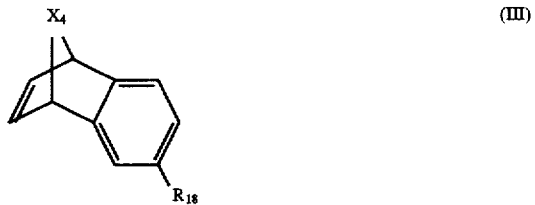

wherein $X_4$ is —$CHR_{19}$—, oxygen or sulfur;

$R_{19}$ is hydrogen, $C_1$-$C_{12}$alkyl, phenyl or benzyl; and $R_{18}$ is hydrogen, $C_1$-$C_6$alkyl or halogen.

14. A process according to claim 11, wherein the norbornene derivative is a compound of formula IV

wherein $X_5$ is —$CHR_{22}$—, oxygen or sulfur, $R_{22}$ is hydrogen, $C_1$-$C_{12}$alkyl, phenyl or benzyl;

$R_{20}$ and $R_{21}$ are each independently of the other hydrogen, CN, trifluoromethyl, $(CH_3)_3Si$—O—, $(CH_3)_3Si$— or —$COOR_{23}$; and $R_{23}$ is hydrogen, $C_1$-$C_{12}$alkyl, phenyl or benzyl.

15. A process according to claim 11, wherein the norbornene derivative is a compound of formula V

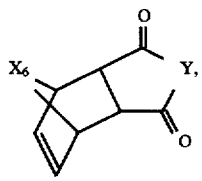

wherein $X_6$ is —$CHR_{24}$—, oxygen or sulfur, $R_{24}$ is hydrogen, $C_1$–$C_{12}$alkyl, phenyl or benzyl;

Y is oxygen or

and $R_{25}$ is hydrogen, methyl, ethyl or phenyl.

16. A process according to claim 1, wherein the molybdenum (VI) and tungsten (VI) compounds are those which contain one metal atom or two metal atoms linked through a single, double or triple bond.

17. A process according to claim 1, wherein two to four metal-ligand bonds are present as methyl groups or monosubstituted methyl groups lacking β-hydrogen atoms and which is bonded to the metal atom.

18. A process according to claim 1, wherein the methyl group or monosubstituted methyl group without β-hydrogen atoms bonded to the metal atom has the formula VII

wherein R is H, —$CF_3$, —$CR_{26}R_{27}R_{28}$, —$SiR_{29}R_{30}R_{31}$, unsubstituted or $C_1$–$C_6$alkyl- or $C_1$–$C_6$alkoxy-substituted $C_6$–$C_{16}$aryl or $C_4$–$C_{15}$heteroaryl containing 1 to 3 hetero atoms selected from the group consisting of O, S and N; and $R_{26}$, $R_{27}$ and $R_{28}$ are each independently of one another $C_1$–$C_{10}$alkyl which is unsubstituted or substituted by $C_1$–$C_{10}$alkoxy, or $R_{26}$ and $R_{27}$ have this meaning and $R_{28}$ is $C_6$–$C_{10}$aryl or $C_4$–$C_9$heteroaryl which is unsubstituted or substituted by $C_1$–$C_6$alkyl or $C_1$–$C_6$alkoxy; and $R_{29}$, $R_{30}$ and $R_{31}$ are each independently of one another $C_1$–$C_6$alkyl, $C_5$— or $C_6$cycloalkyl, or unsubstituted phenyl or benzyl or phenyl or benzyl each substituted by $C_1$–$C_6$alkyl or $C_1$–$C_6$alkoxy.

19. A process according to claim 18, wherein the group R in formula VII is H, —$C(CH_3)_3$, —$C(CH_3)_2C_6H_5$, unsubstituted phenyl or phenyl which is substituted by methyl, ethyl, methoxy or ethoxy, —$CF_3$, or —$Si(CH_3)_3$.

20. A process according to claim 1, wherein the other 1 to 4 valencies of the Mo (VI) and W (VI) atoms can be saturated with identical or different ligands selected from the group consisting of =O, =N—$R_{33}$, secondary amines containing 2 to 18 carbon atoms, $R_{32}$O— or $R_{32}$S—, halogen, cyclopentadienyl or bridged biscylopentadienyl, tridentate monoanionic ligands, neutral ligands, wherein the $R_{32}$ substituents independently of each other are unsubstituted or $C_1$–$C_6$alkoxy- or halogen-substituted linear or branched $C_1$–$C_{18}$alkyl, $C_5$- or $C_6$cycloalkyl which is unsubstituted or substituted by $C_1$–$C_6$alkyl, $C_1$–$C_6$alkoxy or halogen, or phenyl which is unsubstituted or substituted by $C_1$–$C_6$alkyl, $C_1$–$C_6$alkoxy, $C_1$–$C_6$alkoxymethyl, $C_1$–$C_6$alkoxyethyl or halogen, or benzyl which is unsubstituted or substituted by $C_1$–$C_6$alkyl, $C_1$–$C_6$alkoxy, $C_1$–$C_6$alkoxymethyl, $C_1$–$C_6$alkoxyethyl or halogen, or phenylethyl; and $R_{33}$ is unsubstituted or $C_1$–$C_6$alkoxy-subsitituted linear or branched $C_1$–$C_{18}$alkyl, $C_5$- or $C_6$cycloalkyl which is unsubstituted or substituted by $C_1$–$C_6$alkyl, $C_1$–$C_6$alkoxy or halogen, phenyl which is unsubstituted or substituted by $C_1$–$C_6$alkyl, $C_1$–$C_6$alkoxy, $C_1$–$C_6$alkoxymethyl, $C_1$–$C_6$alkoxyethyl, di($C_1$–$C_6$-alkyl) amino, di($C_1$–$C_6$alkyl)amino-$C_1$–$C_3$alkyl or halogen, or benzyl or phenylethyl each of which is unsubstituted or substituted by $C_1$–$C_6$alkyl, $C_1$–$C_6$alkoxy, $C_1$–$C_6$alkoxymethyl, $C_1$–$C_6$alkoxyethyl or halogen.

21. A process according to claim 1, wherein the molybdenum and tungsten compounds are compounds of formulae VIII, VIIIa, VIIIb and VIIIc,

wherein

Me is Mo(VI) or W(VI), at least two of the substituents $R_{39}$ to $R_{44}$ are a radical —$CH_2$—R of formula VII. R is H, —$CF_3$, —$CR_{26}R_{27}R_{28}$, —$SiR_{29}R_{30}R_{31}$, unsubstituted or $C_1$–$C_6$alkyl- or $C_1$–$C_6$alkoxy-substituted $C_6$–$C_{16}$aryl or $C_4$–$C_{15}$heteroaryl containing 1 to 3 hetero atoms selected from the group consisting of O, S and N;

$R_{26}$, $R_{27}$ and $R_{28}$ are each independently of the other $C_1$–$C_{10}$alkyl which is unsubstituted or substituted by $C_1$–$C_{10}$alkoxy, or $R_{26}$ and $R_{27}$ have this meaning and $R_{28}$ is $C_6$–$C_{10}$aryl or $C_4$–$C_9$heteroaryl which is unsubstituted or substituted by $C_1$–$C_6$alkyl or $C_1$–$C_6$alkoxy; and $R_{29}$, $R_{30}$ and $R_{31}$ are each independently of one another $C_1$–$C_6$alkyl, $C_5$- or $C_6$cycloalkyl, or unsubstituted or $C_1$–$C_6$alkyl- or $C_1$–$C_6$alkoxy-substituted phenyl or benzyl;

two each of the remaining substituents $R_{39}$ to $R_{44}$ are =O or =N—$R_{33}$, and $R_{33}$ is unsubstituted or $C_1$–$C_6$alkoxy-substituted linear or branched $C_1$–$C_{18}$alkyl, unsubstituted or $C_1$–$C_6$alkyl-, $C_1$–$C_6$alkoxy- or halogen-substituted $C_5$- or $C_6$cycloalkyl, unsubstituted phenyl or phenyl which is substituted by $C_1$–$C_6$alkyl, $C_1$–$C_6$alkoxy, $C_1$–$C_6$alkoxymethyl, $C_1$–$C_6$alkoxyethyl or halogen, or benzyl or phenylethyl each of which is unsubstituted or substituted by $C_1$–$C_6$alkyl, $C_1$–$C_6$alkoxy, $C_1$–$C_6$alkoxymethyl, $C_1$–$C_6$alkoxyethyl or halogen; and/or the remaining substituents $R_{39}$ to $R_{44}$ are secondary amino containing 2 to 18 carbon atoms, $R_{32}$O— or $R_{32}$S-, halogen, cyclopentadienyl or bridged biscylopentadienyl wherein the $R_{32}$ substituents are each independently of the other unsubstituted or $C_1$-$C_6$alkoxy- or halogen-substituted linear or branched $C_1$-$C_{18}$alkyl, unsubstituted or $C_1$-$C_6$alkyl-, $C_1$-$C_6$alkoxy or halogen-substituted $C_5$- or $C_6$cycloalkyl, unsubstituted phenyl or phenyl which is substituted by $C_1$-$C_6$alkyl, $C_1$-$C_6$alkoxy, $C_1$-$C_6$alkoxymethyl, $C_1$-$C_6$alkoxyethyl, di($C_1$-$C_6$-alkyl)amino, di($C_1$-$C_6$-alkyl)amino-$C_1C_3$alkyl or halogen, or benzyl or phenylethyl each of which is unsubstituted or substituted by $C_1$-$C_6$alkyl, $C_1$-$C_6$alkoxy, $C_1$-$C_6$alkoxymethyl, $C_1$-$C_6$alkoxyethyl or halogen.

22. A process according to claim 21, which comprises using molybdenum and tungsten compounds of formula VIII, wherein a) $R_{39}$ to $R_{44}$ are a radical of formula VII —$CH_2$—R, or b) $R_{39}$ and $R_{40}$ are a radical of formula VII —$CH_2$—R, $R_{41}$ and $R_{42}$ together are a radical =N—$R_{33}$, and $R_{43}$ and $R_{44}$ together are $R_{32}$—O— or halogen, or c) $R_{43}$ and $R_{44}$ together and $R_{41}$ and $R_{42}$ together are the radical =N—$R_{33}$, and $R_{39}$ and $R_{40}$ are a radical of formula VII —$CH_2$—R, wherein R, $R_{32}$ and $R_{33}$ are as defined in claim 21.

23. A process according to claim 21, which comprises using molybdenum and tungsten compounds of formulae IX, IXa or IXb,

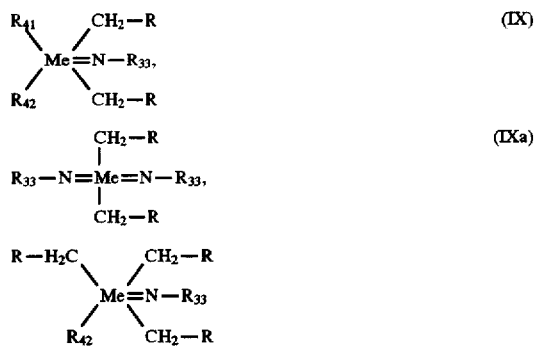

wherein

Me is Mo(VI) or W(VI),

R is H, —C(CH$_3$)$_3$, —C(CH$_3$)$_2$—C$_6$H$_5$, —C$_6$H$_5$ or —Si(C$_1$-C$_4$alkyl)$_3$, $R_{33}$ is phenyl or phenyl which is substituted by 1 to 3 $C_1$-$C_4$alkyl or $C_1$-$C_4$aloxy groups, $R_{41}$ is unsubstituted or fluoro-substituted linear or branched $C_1$-$C_4$alkoxy, and $R_{42}$ has the same meaning as $R_{41}$ or is F, Cl or Br.

24. A process according to claim 23, wherein $R_{41}$ is branched alkoxy or branched alkoxy which may be partially or completely fluorinated.

25. A process according to claim 23, wherein $R_{42}$ is chloro.

26. A process according to claim 21, wherein the molybdenum and tungsten compounds are selected from the group consisting of:

Mo$_2$[CH$_2$Si(CH$_3$)$_3$]$_6$, W(=N—C$_6$H$_5$)[OCH(CH$_3$)$_2$](Cl)[CH$_2$Si(CH$_3$)$_3$]$_2$,

W(=N—C$_6$H$_5$)[OCH(CF$_3$)$_2$]$_2$[CH$_2$Si(CH$_3$)$_3$]$_2$,

Mo(=N—3,5-diisopropylC$_6$H$_3$)$_2$[CH$_2$C(CH$_3$)$_2$—C$_6$H$_5$]$_2$,

Mo(=N—3,5-diisopropylC$_6$H$_3$)$_2$[CH$_2$—C$_6$H$_5$]$_2$, Mo(=N—3,5-dimethylC$_6$H$_3$)$_2$[CH$_2$—C$_6$H$_5$]$_2$, W(=NC$_6$H$_5$)[CH$_2$Si(CH$_3$)$_3$]Cl or Mo(=N—3,5-dimethylC$_6$H$_3$)$_2$(CH$_3$)$_2$(tetrahydrofuran).

27. A process for the photocatalytic polymerisation of a cyclic olefin or at least two different cyclic olefins in the presence of a metal compound as catalyst, which process comprises a) initially irradiating the cycloolefin or cycloolefins in the presence of a catalytic amount of at least one thermostable molybdenum (VI) or tungsten (VI) compound according to claim 1; or irradiating a catalytic amount of at least one thermostable molybdenum (VI) or tungsten (VI) compound according to claim 1, without a solvent or in an inert solvent, and then mixing the catalyst with at least one cycloolefin; and b) terminating the polymerisation using heat.

28. A process according to claim 1, wherein the molybdenum (VI) and tungsten (VI) compounds are used in an amount of 0.001 to 20 mol %, based on the amount of the cycloolefin.

29. A composition comprising (a) a cyclic olefin or at least two different cyclic olefins and (b) a catalytically effective amount of at least one thermostable molybdenum (VI) and tungsten (VI) compound which contains at least two methyl groups or two monosubstituted methyl groups lacking β-hydrogen atoms in thie substituent which are bonded to the metal atom.

* * * * *